(12) United States Patent
Ishikawa et al.

(10) Patent No.: US 6,656,602 B1
(45) Date of Patent: Dec. 2, 2003

(54) GAS BARRIER COATING COMPOSITION, PROCESS FOR PRODUCING THE SAME, AND GAS BARRIER COATING FILM

(75) Inventors: Satoshi Ishikawa, Tokyo (JP); Hiroshi Shiho, Tokyo (JP); Hiroshi Yamamoto, Tokyo (JP); Takuya Yamazaki, Tokyo (JP); Hideki Izawa, Tokyo (JP)

(73) Assignees: JSR Corporation, Tokyo (JP); Dainippon Printing Co., LTD (DNP), Tokyo (JP)

( * ) Notice: Subject to any disclaimer, the term of this patent is extended or adjusted under 35 U.S.C. 154(b) by 0 days.

(21) Appl. No.: 09/926,701

(22) PCT Filed: Jun. 5, 2000

(86) PCT No.: PCT/JP00/03634
§ 371 (c)(1),
(2), (4) Date: Feb. 4, 2002

(87) PCT Pub. No.: WO00/75248
PCT Pub. Date: Dec. 14, 2000

(30) Foreign Application Priority Data

Jun. 4, 1999 (JP) ............................................ 11-158675
Oct. 19, 1999 (JP) ............................................ 11-297047

(51) Int. Cl.⁷ .............................. B32B 27/30; C08J 7/04
(52) U.S. Cl. ..................... 428/522; 428/35.4; 428/36.6; 428/36.7; 428/451; 428/520; 524/104; 524/186; 524/233; 524/261; 524/394; 524/399; 524/404
(58) Field of Search ............................... 428/35.4, 36.6, 428/36.7, 520, 522, 451; 524/104, 186, 233, 261, 394, 399, 404

(56) References Cited

U.S. PATENT DOCUMENTS 6,171,663 B1 * 1/2001 Hanada et al. ............... 349/139

FOREIGN PATENT DOCUMENTS

| JP | 2-47144 | 2/1990 |
|---|---|---|
| JP | 3-164249 | 7/1991 |
| JP | 6-192454 | 7/1994 |
| JP | 6-329821 | 11/1994 |
| JP | 7-233293 | 9/1995 |
| JP | 8-216325 | 8/1996 |
| JP | 9-193284 | 7/1997 |
| JP | 2000-52475 | 2/2000 |

* cited by examiner

*Primary Examiner*—D. S. Nakarani
(74) *Attorney, Agent, or Firm*—Oblon, Spivak, McClelland, Maier & Neustadt, P.C.

(57) ABSTRACT

A gas barrier coating composition which undergoes no decrease in barrier properties to gases such as oxygen and water vapor even under high-humidity conditions, contains no compounds thought to be harmful to the human body, and is harmless to the human body; and a gas barrier coating film with excellent gas barrier properties comprising the composition. The gas barrier coating composition comprises (a) a polyvinyl alcohol resin and (b) at least one member selected from the group consisting of a specific metal alcoholate, a hydrolysate of the metal alcoholate, a condensate of the metal alcoholate, a chelate compound of the metal alcoholate, a hydrolysate of the chelate compound and an acylated metal compound. The coating film obtained from the composition has excellent gas barrier properties.

16 Claims, 2 Drawing Sheets

GAS BARRIER COATING COMPOSITION, PROCESS FOR PRODUCING THE SAME, AND GAS BARRIER COATING FILM

TECHNICAL FIELD

The present invention relates to a gas barrier coating composition used for package applications and the like in pharmaceutical, food, cosmetic, cigarette and toiletry fields and the like, and effective for preventing the permeation of oxygen, water vapor and other gases deteriorating the contents, and a gas barrier coating film excellent in gas barrier properties using the same.

BACKGROUND ART

In recent years, as package materials used for package applications and the like in pharmaceutical, food, cosmetic, cigarette and toiletry fields and the like, materials with gas barrier properties through which oxygen, water vapor and other gases deteriorating the contents do not permeate have been used, for example, for food use, in order to prevent deterioration of the contents such as oxidation of proteins or fats and oils to keep qualities of such as taste.

Complying with such conventional problems, for example, Japanese Patent Laid-open Publication (Hei) 7-266485 proposes a gas barrier material obtained by a procedure that a coating agent containing as a main agent a mixed solution of at least one metal alkoxide or hydrolysate thereof and an isocyanate compound having at least two or more isocyanate groups in its molecule is applied onto a substrate composed of a polymer resin composition, and dried by heating to form a gas barrier coating layer. However, this gas barrier material contains the isocyanate compound having isocyanate groups, melamine, formaldehyde, tin chloride and the like, which might be indirectly orally introduced into the human body, particularly in medical and food applications. Accordingly, the gas barrier material has the problem that it is harmful to the human body.

On the other hand, Japanese Patent No. 1,476,209 proposes a coat material free from an isocyanate and the like and composed of polyvinyl alcohol low in harmfulness. However, the use for retort package for food requires oxygen barrier properties under high humidity, because retorting is carried out under high-temperature, high-humidity conditions of 120° C. or more. The coat material composed of polyvinyl alcohol has the problem that gas barrier properties thereof are significantly influenced by humidity, and the gas barrier properties thereof largely decrease under high humidity.

The present invention has been made against the background of the above-mentioned conventional technical problems, and it is an object of the invention to provide a gas barrier coating composition which undergoes no decrease in barrier properties to gases such as oxygen and water vapor even under high-humidity conditions, which composition does not contain compounds thought to be harmful to the human body, such as an isocyanate group-containing isocyanate compound, melamine, formaldehyde and tin chloride, and which composition is harmless to the human body; and a gas barrier coating film using the same, which film is excellent in gas barrier properties.

DISCLOSURE OF THE INVENTION

The present invention relates to a gas barrier coating composition comprising (a) polyvinyl alcohol resin (hereinafter also referred to as "component (a)") and (b) at least one member selected from the group consisting of a metal alcoholate represented by general formula (1), a hydrolysate of the metal alcoholate, a condensate of the metal alcoholate, a chelate compound of the metal alcoholate, a hydrolysate of the chelate compound and a metal acylate (hereinafter also referred to as "component (b)"):

$$R^1{}_m M(OR^2)_n \qquad (1)$$

wherein M represents a metal atom, $R^1$, which may be either identical to or different from each other, represents an organic group having 1 to 8 carbon atoms, $R^2$, which may be either identical to or different from each other, represents an alkyl group having 1 to 5 carbon atoms, an acyl group having 1 to 6 carbon atom or a phenyl group, and m and n are each integers of 0 or more and m+n is a valence of M.

Here, the above-mentioned polyvinyl alcohol resin (a) includes at least one member selected from the group consisting of polyvinyl alcohol and an ethylene-vinyl alcohol copolymer.

Further, the above-mentioned polyvinyl alcohol resin (a) includes an ethylene-vinyl alcohol copolymer having a melt flow index of 1 to 50 g/10 minutes under the conditions of 210° C. and a load of 21.168 N.

It is preferred in some cases that the gas barrier coating composition of the present invention further contains (c) a nitrogen-containing organic solvent (hereinafter also referred to as "component (c)").

Further, it is preferred in some cases that the gas barrier coating composition of the present invention further contains (d) fine inorganic particles (hereinafter also referred to as "component (d)").

Still further, it is preferred in some cases that the gas barrier coating composition of the present invention further contains (e) a boron compound (hereinafter also referred to as "component (e)").

Yet still further, it is preferred that the gas barrier coating composition of the present invention has a heating gelation rate of 1 to 90%.

Then, the present invention relates to a method for producing the above-mentioned gas barrier coating composition comprising hydrolyzing the above-mentioned component (b) in water or a mixed solvent of water and a hydrophilic organic solvent, followed by mixing with the above-mentioned component (a).

Further, the present invention relates to a gas barrier coating film in which a coating film formed of the above-mentioned gas barrier coating composition is laminated onto a synthetic resin film.

Furthermore, the present invention relates to a gas barrier coating film in which a vapor-deposited film of a metal and/or an inorganic compound and a coating film formed of the above-mentioned gas barrier coating composition are laminated onto a synthetic resin film.

As the above-mentioned vapor-deposited film, a vapor-deposited film of an inorganic oxide by a chemical vapor deposition method and/or a physical vapor deposition method is preferred.

BEST MODE FOR CARRYING OUT THE INVENTION

Gas Barrier Coating Composition

Figure 1:
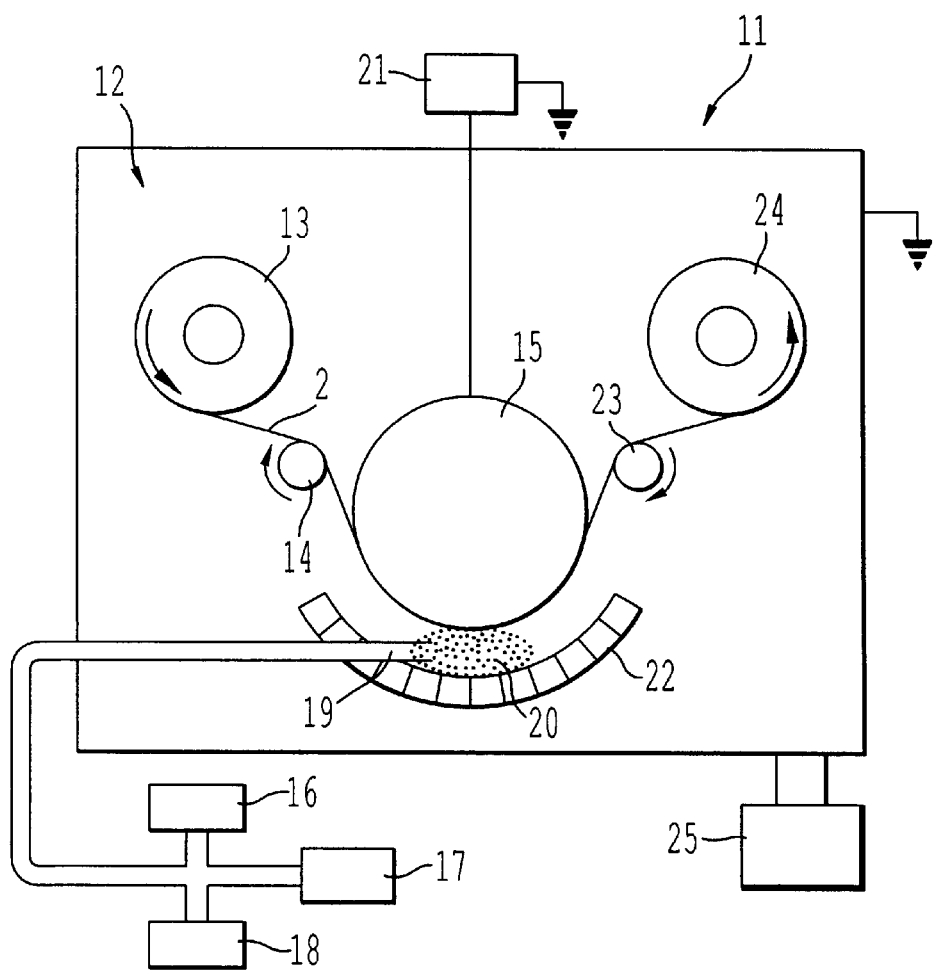
FIG. 1 is a schematic structural view showing a plasma chemical vapor deposition apparatus.

Component (a);

The polyvinyl alcohol resin, component (a) used in the present invention, includes at least one member selected from the group consisting of polyvinyl alcohol and an ethylene-vinyl alcohol copolymer.

Of the above-mentioned components (a), polyvinyl alcohol is generally obtained by saponifying polyvinyl acetate. This polyvinyl alcohol may be partially saponified polyvinyl alcohol in which several tens mole percent of acetic acid groups remain, completely saponified polyvinyl alcohol in which no acetic acid groups remain, or modified polyvinyl alcohol in which OH groups are modified. There is no particular limitation thereon. Specific examples of the above-mentioned polyvinyl alcohol products include RS-110 (degree of saponification=99%, degree of polymerization=1,000) manufactured by KURARAY CO., LTD., which is an RS polymer, Kuraray Poval LM-20SO (degree of saponification=40%, degree of polymerization= 2,000) manufactured by the same company, and GOHSE-NOL NM-14 (degree of saponification=99%, degree of polymerization=1,400) manufactured by The Nippon Synthetic Chemical Industry Co., Ltd., and the like.

Of components (a), the ethylene-vinyl alcohol copolymer is a saponified product of a copolymer of ethylene and vinyl acetate, that is to say, one obtained by saponifying an ethylene-vinyl acetate random copolymer, and includes partially saponified polyvinyl alcohol in which several tens mole percent of acetic acid groups remain to completely saponified polyvinyl alcohol in which only several mole percent of acetic acid groups or no acetic acid groups remain. There is no particular limitation thereon. However, from the viewpoint of gas barrier properties, the degree of saponification is preferably 80 mol % or more, preferably 90 mol % or more, and still more preferably 95 mol % or more.

The content of repeating units derived from ethylene in the ethylene-vinyl alcohol copolymer (hereinafter also referred to as "ethylene content") is usually from 0 to 50 mol %, and preferably from 20 to 45 mol %.

Specific examples of the above-mentioned ethylene-vinyl alcohol copolymers include EVAL EP-F101 (ethylene content: 32 mol %) manufactured by KURARAY CO., LTD., SOARNOL D2630 (ethylene content: 26 mol %), D2908 (ethylene content: 29 mol %), D2935 (ethylene content: 29 mol %) and A3245 (ethylene content: 32 mol %) manufactured by The Nippon Synthetic Chemical Industry Co., Ltd., and the like.

The melt flow index of the above polyvinyl alcohol resin (a) is preferably from 1 to 50 g/10 minutes, more preferably from 5 to 45 g/10 minutes, and particularly preferably from 7 to 40 g/10 minutes, under the conditions of 210° C. and a load of 21.168 N. When the melt flow index is less than 1 g/10 minutes, gas barrier properties decrease in some cases. On the other hand, exceeding 50 g/10 minutes unfavorably results in reduced moisture resistance and solvent resistance in some cases.

These polyvinyl alcohol resins (a) can be used either alone or as a mixture of two or more of them.

The polyvinyl alcohol resin constituting component (a) itself is excellent in gas barrier properties, weather resistance, organic solvent resistance, transparency and gas barrier properties after heat treatment.

In addition, the polyvinyl alcohol resin (a) can bring about excellent coating film properties by copolycondensation of hydroxyl groups existing in repeating units derived from polyvinyl alcohol with component (b) and/or component (c) described later in the process of hardening a coating film obtained from the composition of the present invention. The ratio of component (a) to 100 parts by weight of component (b) described later in the gas barrier coating composition of the present invention is from 10 to 10,000 parts by weight, preferably from 20 to 5, 000 parts by weight, and more preferably from 100 to 1,000 parts by weight. Less than 10 parts by weight results in easy generation of cracks in the resulting coating film to deteriorate gas barrier properties, whereas exceeding 10,000 parts by weight unfavorably causes a reduction in gas barrier properties of the resulting coating film under high humidity.

Component (b);

Component (b) used in the present invention is at least one member selected from the group consisting of a metal alcoholate represented by the above-mentioned general formula (1), a hydrolysate of the metal alcoholate, a condensate of the metal alcoholate, a chelate compound of the metal alcoholate, a hydrolysate of the chelate compound and a metal acylate,. That is to say, component (b) may be only one of these 6 compounds or a mixture of any two or more of them.

Here, in the above-mentioned hydrolysate of the metal alcoholate, it is not necessary that $OR^2$ groups contained in the hydrolysate of the metal alcoholate are all hydrolyzed. For example, it may be one in which only one group is hydrolyzed, one in which two or more groups are hydrolyzed, or a mixture thereof.

The above-mentioned condensate of the metal alcoholate is one in which M—OH groups of the hydrolysate of the metal alcoholate are condensed to form M—O—M bonds. In the present invention, it is not necessary that the M—OH groups are all condensed, and it is a concept including one in which a slight part of the M—OH groups are condensed, a mixture of ones different in the degree of condensation, and the like.

Further, the above-mentioned chelate compound of the metal alcoholate is obtained by the reaction of the metal alcoholate with at least one compound selected from the group consisting of a β-diketone, a β-ketoester, a hydroxycarboxylic acid, a hydroxycarboxylic acid salt, a hydroxycarboxylic acid ester, a keto-alcohol and an amino-alcohol. Of these compounds, the use of a β-diketone or a β-ketoester is preferred. Specific examples of these include acetylacetone, methyl acetoacetate, ethyl acetoacetate, n-propyl acetoacetate, i-propyl acetoacetate, n-butyl acetoacetate, sec-butyl acetoacetate, t-butyl acetoacetate, 2,4-hexanedione, 2,4-heptanedione, 3,5-heptanedione, 2,4-octanedione, 2,4-nonanedione, 5-methylhexanedione and the like.

Furthermore, in the above-mentioned hydrolysate of the chelate compound, it is not necessary that $OR^2$ groups contained in the chelate compound are all hydrolyzed same as the above hydrolysate of the metal alcoholate. For example, it may be one in which only one group is hydrolyzed, one in which two or more groups are hydrolyzed, or a mixture thereof.

Component (b) is considered to act so as to form a co-condensate with component (a).

Preferred examples of the metal atoms represented by M in the above-mentioned general formula (1) include zirconium, titanium and aluminum, and particularly preferred is titanium.

The monovalent organic group having 1 to 8 carbon atoms of $R^1$ varies depending on whether the compound represented by general formula (1) is the metal alcoholate or the metal acylate.

In the case of the metal alcoholate, the organic group includes, for example, an alkyl group such as methyl, ethyl, n-propyl, i-propyl, n-butyl, i-butyl, sec-butyl, t-butyl, n-hexyl, n-heptyl, n-octyl or 2-ethylhexyl; an acyl group such as acetyl, propionyl, butyryl, valeryl, benzoyl or tolyoyl; a vinyl group, an allyl group, a cyclohexyl group, a phenyl group, a glycidyl group, a (meth)acryloxy group, a ureido group, an amido group, a fluoroacetoamido group, an isocyanate group or the like, and besides, a substituted derivative of each group.

The substituent group in the substituted derivative of $R^1$ includes, for example, a halogen atom, a substituted or unsubstituted amino group, a hydroxyl groups, a mercapto group, an isocyanate group, a glycidoxy group, a 3,4-epoxycyclohexyl group, a (meth)acryloxy group, a ureido group, an ammonium salt group or the like. Provided that the carbon number of the substituted derivative of $R^1$ is 8 or less including carbon atoms contained in the substituent group.

In the case of the metal acylate, the monovalent organic group having 1 to 8 carbon atoms of $R^1$ includes an acyloxyl group such as acetoxyl, propionyloxyl, butyryloxyl, valeryloxyl, benzoyloxyl or tolyoyloxyl group.

When two or more $R^1$'s exist in general formula (1), they may be the same with or different from each other.

The alkyl group having 1 to 5 carbon atoms of $R^2$ includes, for example, methyl, ethyl, n-propyl, i-propyl, n-butyl, sec-butyl, t-butyl, n-pentyl or the like, and the acyl group having 1 to 6 carbon atoms includes, for example, acetyl, propionyl, butyryl, valeryl, caproyl or the like.

A plurality of $R^2$'s existing in general formula (1) may be the same with or different from each other.

Of these components (b), specific examples of the metal alcoholates and the chelate compounds of the metal alcoholates include:

(a) zirconium compounds such as tetra-n-butoxyzirconium, ethylacetoacetato-zirconium-tri-n-butylate, bis(ethylacetoacetato)-zirconium-di-n-butylate, tris(ethylacetoacetato)-zirconium-n-butylate, tetrakis(n-propylacetoacetato)-zirconium, tetrakis (acetylacetoacetato)-zirconium, and tetrakis (ethylacetoacetato)-zirconium;

(b) titanium compounds such as tetra-i-propoxytitanium, tetra-n-butoxytitanium, tetra-t-butoxytitanium, bis (ethylacetoacetato)-titanium-di-i-propylate, bis (acetylacetato)-titanium-di-i-propylate, bis (acetylacetonato)-titanium-di-i-propylate, di-n-buthoxy bis(triethanolaminate)titanium and tetrakis(2-ethylhexyloxy)titanium; and (c) aluminum compounds such as tri-i-propoxyaluminum, ethylacetoacetato-aluminum-di-i-propylate, acetylacetonato-aluminum-di-i-propylate, bis (ethylacetoacetato)-aluminum-i-propylate, bis (acetylacetonato)-aluminum-i-propylate, tris-(ethylacetoacetato)-aluminum, tris(acetylacetonato)-aluminum and bis(ethylacetoacetato)-aluminum-monoacetylacetonate.

Preferred examples of these metal alcoholates and chelate compounds of the metal alcoholates include ethylacetoacetato-zirconium-tri-n-butylate, bis (acetylacetonato)-titanium-di-i-propylate, bis (triethanolaminato)titanium-di-n-butylate, dihydroxybislactetatotitanium, ethylacetoacetato-aluminum-di-i-propylate and tris(ethylacetoacetato)-aluminum, and particularly preferred compounds are titanium compounds such as bis(acetylacetonato)-titanium-di-i-propylate, bis (triethanolaminato) titanium-di-n-butylate, and dihydroxybislactetatotitanium.

Further, specific examples of the metal acylates include dihydroxytitanium dibutylate, di-i-propoxytianium diacetate, di-i-propoxytianium dipropionate, di-i-propoxy.tianium-di-malonate, di-i-propoxy.tianium-di-benzoylate, di-n-butoxy-zirconium diacetate and di-i-propoxy.aluminum-mono-malonate. Particularly preferred compounds are titanium compounds such as dihydroxytitanium dibutylate and di-i-propoxytianium diacetate.

These components (b) are used alone or as a mixture of two or more of them.

As component (b), there is preferably used one hydrolyzed in water or a mixed solvent containing water and a hydrophilic organic solvent, which is described in hydrophilic solvents given later, because a coating solution has no change in viscosity with the passage of time and easily handled.

In this case, the amount of water used is from 0.1 to 1000 moles, and preferably from 0.5 to 500 moles, per mole of $R^1_m M(OR^2)_n$.

Further, in the case of the mixed solvent, the compounding ratio of water to the hydrophilic organic solvent is from 10:90 to 90:10 (weight ratio), preferably from 20:80 to 80:20, more preferably from 30:70 to 70:30, and particularly preferably from 35:65 to 65:35.

Component (c);

It is preferred that the coating composition of the present invention contains a nitrogen-containing organic solvent, which is component (c), as needed.

The nitrogen-containing organic solvents of component (c) include, for example, hydrophilic nitrogen-containing organic solvents such as N,N-dimethylacetamide, N,N-dimethylformamide, γ-butyrolactone, N-methylpyrrolidone and pyridine; nucleic acid bases such as thymine, glycine, cytosine and guanine; hydrophilic nitrogen-containing polymers such as polyvinylpyrrolidone, polyacrylamide and polymethacrylamide; and copolymers in which these components are copolymerized.

Of these, preferred are N,N-dimethylacetamide, N,N-dimethylformamide and polyvinylpyrrolidone.

Mixing of component (c) provides a coating film more transparent and better in appearance in coating as a thin film, and exhibits a catalytic effect in condensing with inorganic particles and/or an inorganic laminate. The ratio of the above-mentioned nitrogen-containing organic solvent used is preferably from 1 to 70% by weight, more preferably from 1 to 50% by weight, and particularly preferably from 5 to 50% by weight, in the total amount of solvents.

Component (d);

It is preferred that the gas barrier coating composition of the present invention contains fine inorganic particles, component (d). The above-mentioned fine inorganic particles are a granular inorganic material having an average particle size of 0.2 μm or less and substantially free from a carbon atom. Material examples thereof include metal oxides or silicon oxides, metal nitrides or silicon nitrides and metal borides. Methods for producing the fine inorganic particles include but are not limited to, for example, a vapor phase method of obtaining silicon oxide by hydrolyzing silicon tetrachloride in a flame of oxygen and hydrogen, a liquid phase method of obtaining silicon oxide by ion exchange of sodium silicate, a solid phase method of obtaining silicon oxide by pulverization of silica gel with a mill or the like, and the like.

Specific examples of the compounds include oxides such as $SiO_2$, $Al_2O_3$, $TiO_2$, $WO_3$, $Fe_2O_3$, $ZnO$, $NiO$, $RuO_2$, $CdO$, $SnO_2$, $Bi_2O_3$, $3Al_2O_3 \cdot 2SiO_2$, $Sn-In_2O_3$, $Sb-In_2O_3$ and $CoFeOx$, nitrides such as $Si_3N_4$, $Fe_4N$, $AlN$, $TiN$, $ZrN$ and $TaN$, and borides such as $Ti_2B$, $ZrB_2$, $TaB_2$ and $W_2B$.

Further, the forms of the fine inorganic particles include but are not limited to a powder form and a colloid or sol form in which they are dispersed in water or an organic solvent. Of these, for obtaining excellent coating film properties by co-condensation with component (a) and/or component (b), there are preferably used colloidal oxides in which hydroxyl groups exist on surfaces of particles such as colloidal silica, colloidal alumina, alumina sol, tin sol, zirconium sol, antimony pentaoxide sol, cerium oxide sol, zinc oxide sol and titanium oxide sol.

The average particle size of the fine inorganic particles is 0.2 μm or less, and preferably 0.1 μm or less. When the average particle size exceeds 0.2 μm, gas barrier properties are poor in some cases from the viewpoint of denseness of a film.

The ratio of component (d) in the composition of the present invention is preferably from 10 to 900 parts by weight, and particularly preferably from 20 to 400 parts by weight, based on 100 parts by weight of the total amount of component (a) and component (b). Exceeding 900 parts by weight results in decreased gas barrier properties of the resulting coating film in some cases.

Component (e);

The gas barrier coating composition used in the present invention can contain a boron compound (e) for the purpose of improving storage stability and hardening properties of the coating composition. The boron compounds (e) include boric acid, boron oxide, borax and the like. Above all, boric acid is preferred.

The ratio of component (e) in the composition of the present invention is preferably from 0.05 to 30 parts by weight, and particularly preferably from 0.1 to 20 parts by weight, based on 100 parts by weight of the total amount of components (a) to (f). Less than 0.05 part by weight results in poor storage stability at low temperatures to be rapidly clouded in some cases, whereas exceeding 30 parts by weight might unfavorably cause whitening of a coating film obtained.

Optional Components;

Hardening accelerator (f) may be used for the purposes of hardening the composition of the present invention more rapidly and making it easy to form a co-condensate of component (a) and component (b), and it is more effective to use this hardening accelerator (f) together for achieving hardening at relatively low temperatures and obtaining a denser coating film.

These hardening accelerators (f) include inorganic acids such as hydrochloric acid; alkali metal salts of naphthenic acid, octylic acid, nitrous acid, sulfurous acid, aluminic acid, carbonic acid and the like; alkaline compounds such as sodium hydroxide and potassium hydroxide; acidic compounds such as an alkyltitanic acid, phosphoric acid, methanesulfonic acid, p-toluenesulfonic acid, phthalic acid, succinic acid, glutaric acid, oxalic acid and malonic acid; and amine compounds such as ethylenediamine, hexanediamine, diethylenetriamine, triethylenetetramine, tetraethylenepentamine, piperidine, piperazine, metaphenylenediamine, ethanolamine, triethylamine, various modified amines used as hardening agents for epoxy resins, γ-aminopropyltriethoxysilane, γ-(2-aminoethyl)aminopropyltrimethoxysilane, γ-(2-aminoethyl)aminopropylmethyldimethoxysilane and γ-anilinopropyltrimethoxysilane.

The ratio of hardening accelerator (f) used in the composition is usually from 0.5 to 50 parts by weight, and preferably from 0.5 to 30 parts by weight, based on 100 parts by weight of the solid matter of the composition of the present invention.

Further, the above-mentioned β-diketone and/or β-ketoester can be added to the composition of the present invention as a stability improver. That is to say, it is considered that it coordinates with a metal atom in the above-mentioned metal alcoholate existing in the composition as the above-mentioned component (b), thereby controling the condensation reaction of component (a) and component (b), finally improving storage stability of the resulting composition. The amount of the β-diketone and/or β-ketoester used is preferably 2 moles or more, and more preferably from 3 to 20 moles, based on mole of the metal atom in the above-mentioned component (b).

The gas barrier coating composition of the present invention is usually obtained by dissolving and dispersing the above-mentioned components (a) and (b), and the above-mentioned optional components according to circumstances, in water and/or a hydrophilic organic solvent.

Here, specific examples of the hydrophilic organic solvents include a monohydric or dihydric saturated aliphatic alcohol having 1 to 8 carbon atoms such as methanol, ethanol, n-propanol, i-propanol, n-butyl alcohol, sec-butyl alcohol, tert-butyl alcohol, diacetone alcohol, ethylene glycol, diethylene glycol or triethylene glycol; a saturated aliphatic ether compound having 1 to 8 carbon atoms such as ethylene glycol monobutyl ether or ethylene glycol monobutyl ether; an ester compound of a dihydric saturated aliphatic alcohol having 1 to 8 carbon atoms such as ethylene glycol monomethyl ether acetate, ethylene glycol monoethyl ether acetate or ethylene glycol monobutyl ether acetate; a sulfur-containing compound such as dimethyl sulfoxide; a hydroxycarboxylic acid or a hydroxycarboxylic ester such as lactic acid, methyl lactate, ethyl lactate, salicylic acid or methyl salicylate; and the like. Of these, preferred is a monohydric saturated aliphatic alcohol having 1 to 8 carbon atoms such as methanol, ethanol, n-propanol, i-propanol, n-butyl alcohol, sec-butyl alcohol or tert-butyl alcohol.

The water and/or the hydrophilic organic solvent is more preferably used as a mixture of water and a hydrophilic organic solvent. The composition of the solvent is preferably water/a monohydric saturated aliphatic alcohol having 1 to 8 carbon atoms, water/component (c) (nitrogen-containing organic solvent), or water/a monohydric saturated aliphatic alcohol having 1 to 8 carbon atoms/component (c) (nitrogen-containing organic solvent).

As to the amount of the water and/or the hydrophilic organic solvent used, the water and/or the hydrophilic organic solvent is preferably used so as to give a total solid concentration of 60% by weight or less. For example, when used for the purpose of forming a thin film, it is usually from 1 to 40% by weight, and preferably from 2 to 30% by weight. Further, when used for the purpose of a thick film, it is usually from 5 to 50% by weight, and preferably from 10 to 45% by weight. When the total solid concentration of the composition exceeds 60% by weight, the storage stability of the composition tends to decrease.

As the organic solvent, the above-mentioned water and/or hydrophilic organic solvent is preferred. However, in addition to the hydrophilic organic solvent, there can also be used, for example, an aromatic hydrocarbon such as benzene, toluene or xylene, an ether such as tetrahydrofuran or dioxane, a ketone such as acetone or methyl ethyl ketone, an ester such as ethyl acetate or butyl acetate, or the like.

Thus, the gas barrier coating composition of the present invention is obtained by mixing the above-mentioned components (a) and (b), and the above-mentioned optional components according to circumstances, in the water and/or the hydrophilic organic solvent, and preferably by hydrolyzing and/or condensing the above-mentioned components (a) and (b), and the above-mentioned optional components according to circumstances, in the water and/or the hydrophilic organic solvent. In this case, with respect to reaction conditions, the temperature is from 5 to 100° C., preferably from 20 to 90° C., and more preferably from 30 to 80° C., and the time is 0.005 to 20 hours, more preferably from 0.1 to 20 hours, and preferably from 0.1 to 10 hours.

The weight average molecular weight of the resulting composition is usually from 500 to 1,000,000, and preferably from 1,000 to 300,000, in the value converted to a polymethyl methacrylate basis by the general GPC method. Details of a method for measuring the weight average molecular weight are shown in Examples.

It is also possible to separately add a filler to the gas barrier coating composition and dispersing it therein, for coloring the resulting coating film, thickening it, preventing permeation of ultraviolet rays to a substrate, imparting corrosion resistance, and allowing it to exhibit various properties such as heat resistance. However, the above-mentioned component (d) is excluded from the filler.

The fillers include, for example, water-insoluble pigments such as organic pigments and inorganic solvents, granular, fibrous or scaly metals and alloys other than pigments, oxides, hydroxides, carbides, nitrides and sulfides thereof, and the like. Specific examples of the fillers include granular, fibrous or scaly iron, copper, aluminum, nickel, silver, zinc, ferrite, carbon black, stainless steel, silicon dioxide, titanium oxide, aluminum oxide, chromium oxide, manganese oxide, iron oxide, zirconium oxide, cobalt oxide, synthetic mullite, aluminum hydroxide, iron hydroxide, silicon carbide, silicon nitride, boron nitride, clay, diatom earth, slaked lime, gypsum, talc, barium carbonate, calcium carbonate, magnesium carbonate, barium sulfate, bentonite, mica, zinc green, chrome green, cobalt green, viridian, Guignet's green, cobalt chrome green, shale green, green soil, manganese green, pigment green, ultramarine, Prussian blue, pigment green, rocky blue, cobalt blue, cerulean blue, copper borate, molybdenum blue, copper sulfide, cobalt purple, mars violet, manganese purple, pigment violet, lead suboxide, calcium plumbate, zinc yellow, lead sulfide, chrome yellow, yellow soil, cadmium yellow, strontium yellow, titanium yellow, litharge, pigment yellow, copper suboxide, cadmium red, selenium red, chrome vermilion, Indian red, zinc white, antimony white, basic lead sulfate, titanium white, lithopone, lead silicate, zirconium oxide, tungsten white, Bantison white, lead phthalate, manganese white, lead sulfate, graphite, bone black, diamond black, Thermatomic black, plant black, potassium titanate whisker and molybdenum disulfide.

The average particle size or average length of these fillers is usually from 50 to 50,000 nm, and preferably from 100 to 5,000 nm.

The ratio of the filler in the composition is preferably from 0 to 300 parts by weight, and more preferably from 0 to 200 parts by weight, based on 100 parts by weight of the total solid content of components other than the filler.

Besides, known dehydrating agents such as methyl orthoformate, methyl orthoacetate and tetraethoxysilane, various surfactants, and additives other than the above, such as silane coupling agents, titanium coupling agents, dyes, dispersing agents, thickening agents and leveling agents, can also be added to the gas barrier coating compositions of the present invention.

The preparation of the gas barrier coating composition of the present invention only requires the preparation of a composition containing the above-mentioned components (a) and (b), components (a) to (d), or components (a) to (e) Above all, preferably the above-mentioned component (b) is hydrolyzed in water or a mixed solvent containing water and a hydrophilic organic solvent, followed by mixing component (a) therewith. Thus, the gas barrier coating composition having no change in viscosity with the passage of time and excellent in handling properties is obtained.

Specific examples of methods for preparing the gas barrier coating composition of the present invention at the time when component (d) is used include, for example, the following (1) to (4). As component (b) used in these preparing methods, there may be used one previously hydrolyzed in water or a mixed solvent containing water and a hydrophilic organic solvent.

(1) A method of adding component (d) to component (a) dissolved in water and/or a hydrophilic organic solvent, and then, adding component (b);

(2) A method of adding component (d) to component (a) dissolved in water and/or a hydrophilic organic solvent, then, adding component (b), and conducting hydrolysis and/or condensation;

(3) A method of adding component (b) to component (a) dissolved in water and/or a hydrophilic organic solvent, conducting hydrolysis and condensation, and then, adding component (d); and (4) A method of adding components (a), (b) and (d) collectively to water and/or a hydrophilic organic solvent, and dissolving and dispersing them, or thereafter conducting hydrolysis and/or condensation.

There is no particular limitation on the time and method of adding component (e), and it may be added at any time and by any method.

Further, specific examples of methods for preparing the coating composition of the present invention at the time when component (c) is used, generally include but are not limited to a method of adding component (c) previously dispersed in water and/or a mixed solvent containing a hydrophilic organic solvent to component (a) dissolved in water and/or a mixed solvent containing a hydrophilic organic solvent, a method of adding component (c) previously dispersed in water and/or a mixed solvent containing a hydrophilic organic solvent to component (b), and a method of preparing a coating composition of components (a) and (b), or components (a), (b), (d) and (e), and then, adding component (c) dispersed in water and/or a mixed solvent containing a hydrophilic organic solvent.

It is preferred that the coating composition of the present invention contains a gel after formation of a coating film.

Specifically, the rate of insoluble matter (hereinafter referred to as the "heating gelation rate", which is calculated from the insoluble matter obtained by applying the coating composition of the present invention onto a PET film so as to give a film thickness of 1 μm, then, drying it at 140° C. for 2 minutes to form a film, and dissolving 0.25 g of the film in 83 ml of a mixed solvent of n-propanol and water (n-propanol/water (weight ratio)=1/1) at 60° C. for 1 hour, followed by filtration and drying of the insoluble matter, is preferably from 1 to 90%, and more preferably from 5 to 70%. When the heating gelation rate is less than 1%, water resistance is unfavorably extremely decreased to deteriorate gas barrier properties. On the other hand, exceeding 90% unfavorably results in an increase in water absorption to deteriorate gas barrier properties.

Gas Barrier Coating Film

The gas barrier coating composition of the present invention is particularly useful for a gas barrier coat material. That is to say, a gas barrier coating film excellent in gas barrier properties is obtained by laminating a coating film composed of the gas barrier coating composition of the present invention, or a vapor-deposited film of a metal and/or an inorganic compound and a coating film composed of the gas barrier coating composition of the present invention onto a synthetic resin film.

Here, the synthetic resin films are sheet-form or film-form, and there can be used films or sheets of various resins, for example, polyolefin resins such as polyethylene and polypropylene, polyester resins such as polyethylene terephthalate and polyethylene naphthalate, polyamide resins such as nylon 6, nylon 6,6, nylon 4,6 and nylon 12, polyamideimides, polyimides, polyetherimides, polysulfones, polyethersulfones, polyetherketones, polycarbonate resins, polystyrene resins, polyvinyl alcohol, polyvinyl alcohol resins such as saponified products of ethylene-vinyl acetate copolymers, polyacrylonitrile resins, polyvinyl chloride resins, polyvinyl acetal resins, polyvinyl butyral resins, polyarylates, polyphenylene sulfide, polyphenylene oxide, fluororesins such as tetrafluoroethylene, ethylene monochloride trifluoride and ethylene fluoride-propylene copolymers, and others. In the present invention, as a method for forming the above-mentioned resin films or sheets, for example, using one or more of the above-mentioned resins, by a method for forming films of the above-mentioned resins alone using the inflation method, the T-die method or other film formation methods, or a method for forming films by multilayer co-extrusion using two or more kinds of different resins, or further, a method for forming films by using two or more kinds of resins and mixing them before film formation, and further stretched uniaxially or biaxially by utilizing, for example, the tenter system or the tubular system, the above-mentioned films or sheets of the resins are formed. In the present invention the thickness of the substrate film is preferably from about 5 to about 200 $\mu$m, and more preferably from about 10 to 50 $\mu$m.

In the above, for improving and modifying, for example, workability, heat resistance, weather resistance, mechanical properties, dimensional stability, resistance to oxidation, slipperiness, mold-release, flame retardance, antifungal properties, electric characteristics and others of the films in forming the films of the resins, various plastic formulating ingredients and additives can be added.

The amount thereof added may be any ranging from a very small amount to several tens of percent, depending on the purpose thereof. Further, in the above, as general additives, there can be used, for example, a lubricant, a crosslinking agent, an antioxidant, an ultraviolet absorber, a plasticizer, a filler, a toughening agent, a reinforcing agent, an antistatic agent, a fire retardant, a flame-resistant agent, a foaming agent, a fungicide, a colorant such as a coating or a pigment, and others. Further, resins for modification can also be used.

Further, in the present invention, the substrate films can be arbitrarily subjected to, for example, corona discharge treatment, ozone treatment, low-temperature plasma treatment using oxygen gas or nitrogen gas, glow plasma treatment, reverse sputtering treatment, oxidation treatment using chemicals and the like, and other pretreatment, as needed. The above-mentioned surface pretreatment may be carried out in a separate stage before the formation of vapor-deposited films of inorganic oxides. Further, for example, in the case of surface treatment by low-temperature plasma treatment, glow discharge treatment or the like, pretreatment can be achieved by inline treatment as the pretreatment for the formation of the above-mentioned vapor-deposited films of the inorganic oxides. Such a case has the advantage that the production cost thereof can be reduced. The above-mentioned surface pretreatment is carried out as methods for improving adhesion of the vapor-deposited films of the inorganic oxides to the substrate films.

Besides, as a method for improving the above-mentioned adhesion, for example, primer coating agent layers, under-coating agent layers, vapor deposition anchor coating agent layers or the like can also be arbitrarily previously formed on the substrate films. As the above-mentioned coating agents for pretreatment, there can be used, for example, resin compositions (primers) containing ethyleneimine resins, amine resins, epoxy resins, polyester resins, polyurethane resins or others as main components of vehicles.

As a method for coating the above-mentioned coating agent layers, coating can be conducted, for example, using solvent type, aqueous type or emulsion type coating agents, and using the roll coating method, the gravure coating method, the kiss coating method or other coating methods. As to the coating time, coating can be conducted as an after-stage after biaxial stretching treatment of the substrate films, or as inline treatment of biaxial stretching treatment. In the present invention, as the substrate film, specifically, a biaxially stretched polypropylene film, a biaxially stretched polyethylene terephthalate film or a biaxially stretched nylon film can be preferably used.

A coating film formed of the gas barrier coating composition of the present invention (hereinafter also referred to as a "coating film of the present invention") is laminated onto a substrate such as the above-mentioned synthetic resin film (hereinafter also referred to as a "substrate"). In this case, it is also possible to laminate a vapor-deposited film of a metal and/or an inorganic compound (hereinafter also referred to as a "vapor-deposited film") onto the substrate or the coating film of the present invention. Gas barrier properties are more improved by providing this vapor-deposited film.

When the vapor-deposited film is present, the vapor-deposited film and the above-mentioned component (b) form a chemical bond, a hydrogen bond, a coordinate bond or the like by hydrolysis-co-condensation reaction to improve the adhesion of the vapor-deposited film to the gas barrier coating layer.

As the above-mentioned vapor-deposited film, preferred is a vapor-deposited film of an inorganic oxide produced by a chemical vapor deposition method and/or a physical vapor deposition method.

Here, the vapor-deposited film of the inorganic oxide produced by the chemical vapor deposition method, which constitutes the gas barrier coating film of the present invention, is described. The vapor-deposited film of the inorganic oxide produced by the chemical vapor deposition method (CVD method) can be formed by using the chemical vapor deposition method such as a plasma chemical vapor deposition method, a thermochemical vapor deposition method or a photochemical vapor deposition method. In the present invention, specifically, it can be produced by a method for forming the vapor-deposited film of the inorganic oxide such as silicon oxide on one face of the substrate film by using the plasma chemical vapor deposition method (CVD method), in which a monomer gas for vapor deposition such as an organic silicone compound is used as a raw material, an inert gas such as argon gas or helium gas is used as a carrier gas, further, oxygen gas is used as an oxygen supply gas, and a low-temperature plasma generator and the like are utilized. In the above, as the low-temperature plasma generator, there can be used, for example, a high-frequency plasma, pulse-wave plasma or microwave plasma generator. In the present invention, it is desirable to use the generator according to the high-frequency plasma system in order to obtain stable high active plasma.

Specifically, the method for forming the vapor-deposited film of the inorganic oxide by the above-mentioned low-temperature plasma chemical vapor deposition method is illustrated by way of an example thereof. FIG. 1 is a schematic structural view of a low-temperature plasma chemical vapor deposition apparatus, indicating an outline of the method for forming the vapor-deposited film of the inorganic oxide by the above-mentioned plasma chemical vapor deposition method.

As shown in FIG. 1 described above, in the present invention, a substrate film 2 is drawn out of an unwinding roll 13 disposed in a vacuum chamber 12 of a plasma chemical vapor deposition apparatus 11, and further, the substrate film 2 is transferred to a peripheral surface of a cooling-electrode drum via a supplementary roll 14 at a determined speed.

Thus, in the present invention, a monomer gas for vapor deposition such as oxygen gas, an inert gas and an organic silicone compound, others and the like are supplied from gas supply devices 16 and 17, a raw material evaporation supply device 18 and the like, and they pass through a raw material supply nozzle 19, while preparing a mixed gas composition for vapor deposition composed of them. The mixed gas composition for vapor deposition is introduced into the chamber 12. Then, plasma is generated by glow discharge plasma 20 on the substrate film 2 transferred onto a peripheral surface of the above-mentioned cooling-electrode drum 15, and irradiated to form a continuous film of an inorganic oxide such as silicon oxide, thereby forming a film.

In the present invention, determined electric power is applied from a power supply 21 arranged outside the chamber to the cooling-electrode drum 15 in this case. Further, a magnet 22 is disposed in the vicinity of the cooling-electrode drum 15 to enhance the generation of the plasma. Then, the substrate film 2 on which the continuous film of the inorganic oxide such as silicon oxide is formed in the above is wound up on a take-up roll 24 via a supplementary roll 23, thereby allowing the vapor-deposited film of the inorganic oxide according to the chemical vapor deposition method of the present invention to be formed. In the drawing, numeral 25 indicates a vacuum pump.

Needless to say, the above-mentioned illustration show an example of the invention, and it is to be understood that the invention is not limited thereby.

Although not shown in the drawing, in the present invention, the vapor-deposited film of the inorganic oxide may be not only composed of one layer of a continuous film of the inorganic oxide, but also in the state of a composite vapor-deposited film in which two or more layers are laminated. Further, materials used can also be used alone or as a mixture of two or more of them. Furthermore, the vapor-deposited film of the inorganic oxide in which different kinds of materials are mixed can also be constituted.

In the above, it is desirable that the pressure in the vacuum chamber 12 is reduced with the vacuum pump 25 to adjust the degree of vacuum to about $1 \times 10^{-1}$ to about $1 \times 10^{-8}$ Torr, and preferably to about $1 \times 10^{-3}$ to about $1 \times 10^{-7}$ Torr.

Further, in the raw material evaporation supply device 18, the organic silicone compound, which is the raw material, is evaporated, and mixed with the oxygen gas, the inert gas and the like supplied from the gas supply devices 16 and 17. Then, the mixed gas is introduced into the chamber 12 through the raw material supply nozzle 19.

In this case, the content of the organic silicone compound in the mixed gas can be within the range of about 1 to about 40 mol %, the content of the oxygen gas can be within the range of about 10 to about 70 mol %, and the content of the inert gas can be within the range of about 10 to about 60 mol %. Further, the mixing molar ratio of the organic silicone compound, the oxygen gas and the inert gas can be from about 1:6:5 to about 1:17:14.

On the other hand, the determined voltage is applied from the power supply 21 to the cooling-electrode drum 15, so that glow discharge plasma 20 is generated in the vicinity of an opening of the raw material supply nozzle 19 and the cooling-electrode drum 15 in the chamber 12. This glow discharge plasma 20 is derived from one or more gas components in the mixed gas. In this state, the substrate film 2 is transferred at a constant speed, and the vapor-deposited film of the inorganic oxide such as silicon oxide can be formed on the substrate film 2 on the peripheral surface of the cooling-electrode drum 15 by glow discharge plasma 20.

It is desirable to adjust the degree of vacuum in the vacuum chamber 12 at this time to about $1 \times 10^{-1}$ to about $10^{-4}$ Torr, and preferably to about $1 \times 10^{-1}$ to about $10^{-2}$ Torr. Further, it is desirable to adjust the transferring speed of the substrate film 2 to about 10 to about 300 m/minute, and preferably to about 50 to about 150 m/minute.

In the above-mentioned plasma chemical vapor deposition apparatus 11, the formation of the continuous film of the inorganic oxide such as silicon oxide is conducted on the substrate film 2, in the form of $SiO_x$ in the thin film form, while oxidizing the raw material gas changed into a plasma state with the oxygen gas, so that the formed vapor-deposited film of the inorganic oxide such as silicon oxide becomes a continuous layer which is dense, has few cracks therein and few gaps between the films and is excellent in flexibility. Accordingly, gas barrier properties of the vapor-deposited film of the inorganic oxide such as silicon oxide are far raised compared with that of a vapor-deposited film of the inorganic oxide such as silicon oxide formed by a conventional vacuum vapor deposition method or the like, thus allowing the vapor-deposited film to obtain sufficient gas barrier properties in thin thickness.

Further, in the present invention, a surface of the substrate film 2 is purified by $SiO_x$ plasma, and polar groups or free radicals are brought about on the surface of the substrate film 2, so that the present invention has the advantage that the adhesion of the formed vapor-deposited film of the inorganic oxide such as silicon oxide to the substrate film is increased.

Furthermore, as described above, the degree of vacuum in forming the vapor-deposited film of the inorganic oxide such as silicon oxide is adjusted to about $1 \times 10^{-1}$ to about $1 \times 10^{-4}$ Torr, and preferably to about $1 \times 10^{-1}$ to about $1 \times 10^{-2}$ Torr. Accordingly, the degree of vacuum is low compared with that in forming a vapor-deposited film of the inorganic oxide such as silicon oxide by a conventional vacuum vapor deposition method, about $1 \times 10^{-4}$ to about $1 \times 10^{-5}$ Torr, so that the time required for establishing the vacuum state in changing a raw film of the substrate film 2 can be shortened, and the degree of vacuum is easily stabilized, which causes stabilization of the film formation process.

In the present invention, the vapor-deposited film of silicon oxide formed by the use of the monomer gas for vapor deposition such as the organic silicon compound is formed by the process that the monomer gas for vapor deposition such as the organic silicon compound is chemically reacted with the oxygen gas and the like, and the reaction product adheres to one surface of the substrate film to form a thin film which is dense and excellent in flexibility. Usually, it is a continuous thin film mainly composed of silicon oxide represented by general formula $SiO_x$ (wherein X represents a numeral of 0 to 2).

The above-mentioned vapor-deposited film of silicon oxide is preferably a thin film mainly composed of a continuous film of silicon oxide represented by general formula $SiO_x$ (wherein X represents a numeral of 1.3 to 1.9) in terms of transparency and gas barrier properties.

In the above, the value of X varies depending on the molar ratio of the monomer gas for vapor deposition to the oxygen gas, the energy of plasma, and the like. However, although the lower value of X generally results in the lower degree of gas permeation, the film itself is tinged with yellow, resulting in poor transparency.

Further, the above-mentioned vapor-deposited film of silicon oxide is characterized by a continuous film mainly composed of silicon oxide and further containing at least one compound composed of one, or two or more elements of carbon, hydrogen, silicon and oxygen by chemical bonding and the like.

Examples thereof include a compound having a C—H bond, a compound having Si—H bond, the case in which a carbon unit is in the graphite form, the diamond form, the Fullerene form or the like, and further, the case containing an organic silicone compound of a raw material or a derivative thereof by chemical bonding and the like.

Specific examples thereof include a hydrocarbon having a $CH_3$ site, a hydrosilica having silyl $SiH_3$, silylene $SiH_2$ or the like, a hydroxyl group derivative having silanol $SiH_2OH$ or the like, and the like.

In addition to the above, the kind, the amount and the like of compound contained in the vapor-deposited film of silicon oxide can be changed by varying the conditions of the vapor deposition process.

It is desirable that the content of the above-mentioned component contained in the vapor-deposited film of silicon oxide is from about 0.1 to about 50 mol % and preferably from about 5 to 20 mol %. Less than 0.1 mol % results in insufficient impact resistance, spreading, flexibility and so on to cause scratches, cracks and the like to be easily brought about by bending, which makes it difficult to stably maintain high gas barrier properties. On the other hand, exceeding 50 mol % unfavorably results in decreased gas barrier properties.

Further, in the present invention, it is preferred that the content of the above-mentioned compound in the vapor-deposited film of silicon oxide is decreased from a surface of the vapor-deposited film of silicon oxide toward the depth direction. This has the advantage that impact resistance is increased by the above-mentioned compound and the like on the surface of the vapor-deposited film of silicon oxide, whereas the adhesion of the vapor-deposited film of silicon oxide to the substrate film becomes strong, because the content of the above-mentioned compound is small in the interface thereof.

In the present invention, with respect to the above-mentioned vapor-deposited film of silicon oxide, the elemental analysis of the vapor-deposited film of silicon oxide is carried out, utilizing a method of analyzing by conducting ion etching and the like in the depth direction by the use of a surface analyzer such as an X-ray photoelectron spectroscopy (XPS) and a secondary ion mass spectroscopy (SIMS), thereby allowing the physical properties as described above to be confirmed.

Further, in the present invention, the thickness of the above-mentioned vapor-deposited film of silicon oxide is preferably from about 5 to about 400 nm, and more preferably from about 10 to about 100 nm. When the thickness is less than 10 nm, and further less than 5 nm, it unfavorably becomes difficult to achieve the effect of gas barrier properties. On the other hand, when the thickness is thicker than 100 nm, and further thicker than 400 nm, a crack and the like are unfavorably liable to bring about in the film.

In the above, the thickness can be measured by the fundamental parameter method, for example, using a fluorescent X-ray analyzer (name of kind: type RIX2000) manufactured by Rigaku, Ltd.

Further, in the above, as a means for changing the thickness of the vapor-deposited film of silicon oxide, there can be used a method of increasing the volume velocity of the vapor-deposited film, that is to say, a method of increasing the amounts of the monomer gas and the oxygen gas, a method of retarding the vapor-depositing rate, or the like.

In the above, as the monomer gases for vapor deposition such as the organic silicone compounds for forming the vapor-deposited films of the inorganic oxides such as silicon oxide, there can be used, for example, 1,1,3,3-tetramethyldisiloxane, hexamethyldisiloxane, vinyltrimethylsilane, methyltrimethylsilane, hexamethyldisilane, methylsilane, dimethylsilane, trimethylsilane, diethylsilane, propylsilane, phenylsilane, vinyltriethoxysilane, vinyltrimethoxysilane, tetramethoxysilane, tetraethoxysilane, phenyltrimethoxysilane, methyltriethoxysilane, octamethylcyclotetrasiloxane and the like.

In the present invention, of the above-mentioned organic silicone compounds, 1,1,3,3-tetramethyldisiloxane or hexamethyldisiloxane is particularly preferably used as the raw material, in terms of its handling properties, characteristics of the continuous film formed, and the like.

Further, in the above, as the inert gases, there can be used, for example, argon gas and helium gas.

Then, the vapor-deposited film of the inorganic oxide obtained by the physical vapor deposition method, which constitutes the gas barrier coating film of the present invention, can be formed by the use of the physical vapor deposition method (PVD method) such as a vacuum vapor deposition method, a sputtering method or an ion plating method. Specifically, the vapor-deposited film can be formed by a vacuum vapor deposition method of using a metal oxide as a raw material and vapor-depositing this on a substrate film by heating, an oxidation reaction vapor deposition method of using a metal or a metal oxide as a raw material and introducing oxygen to oxidize it, thereby vapor-depositing it on a substrate film, an oxidation reaction vapor deposition method of a plasma assist system of assisting an oxidation reaction by plasma, or the like.

Figure 2:
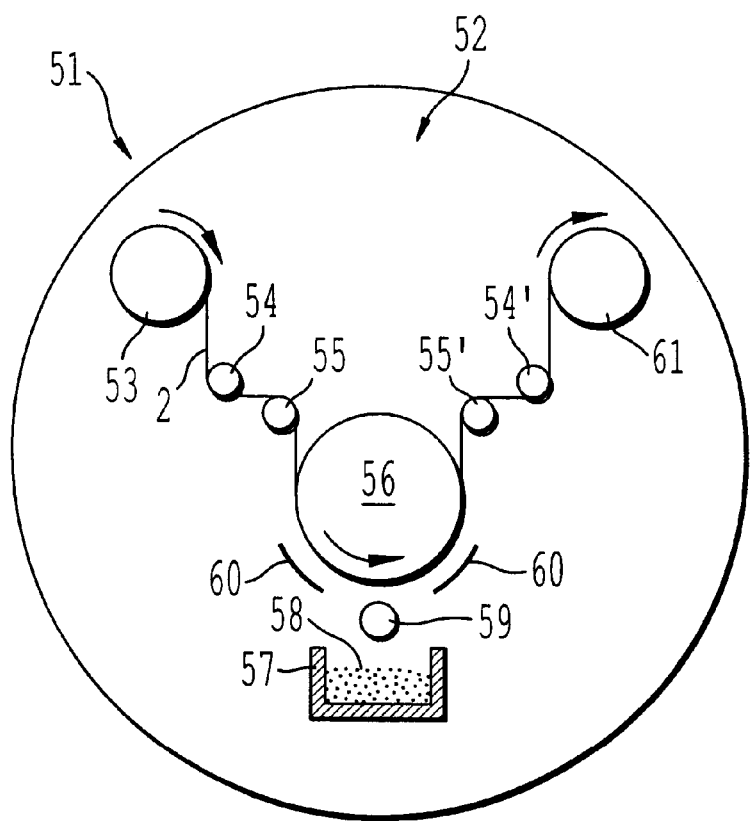
FIG. 2 is a schematic structural view showing a take-up type vacuum vapor deposition apparatus.

An example of a method for forming the vapor-deposited film of the inorganic oxide according to the physical vapor deposition method of the present invention is illustrated with reference to a drawing. FIG. 2 is a schematic structural view showing a take-up type vacuum vapor deposition apparatus. As shown in FIG. 2, a substrate film 2 is drawn out of an unwinding roll 53 in a vacuum chamber 52 of a take-up type vacuum vapor deposition apparatus 51, and guided to a cooled coating drum 56 via guide rolls 54 and 55. A vapor deposition source 58, for example, metallic aluminum, aluminum oxide or the like, heated in a crucible 57 is evaporated on a vapor-deposited film of an inorganic oxide of the substrate film 2 guided onto the above-mentioned cooled coating drum 56, and oxygen gas or the like is injected from an oxygen gas blow-off outlet 59 as needed. While supplying this, a vapor-deposited film of an inorganic oxide such as aluminum oxide is formed through masks 60 and 60. Then, the substrate film 2 having the vapor-deposited film of the inorganic oxide such as aluminum oxide formed thereon is sent out via guide rolls 55' and 54', and wound up on a take-up roll 61. Thus, the vapor-deposited film of the inorganic oxide according to the physical vapor deposition method of the present invention can be formed.

The above-mentioned vapor-deposited film of the inorganic oxide may be any, as long as it is a thin film on which a metal oxide is vapor-deposited. For example, there can be used vapor-deposited films of oxides of metals such as silicon (Si), aluminum (Al), magnesium (Mg), calcium (Ca), potassium (K), tin (Sn), sodium (Na), boron (B), titanium (Ti), lead (Pb), zirconium (Zr) and yttrium (Y). Ones suitable for packaging materials include oxides of metals such as silicon (Si) and aluminum (Al). The above-mentioned vapor-deposited films of the metal oxides can be called metal oxides such as oxides of silicon, oxides of aluminum and oxides of magnesium, and are indicated by $MO_x$ (wherein M represents a metal element, and the value of X varies in the range thereof depending on the metal element) such as $SiO_x$, $AlO_x$ and $MgO_x$. The value of X described above can range from 0 to 2 for silicon (Si), from 0 to 1.5 for aluminum (Al), from 0 to 1 for magnesium (Mg), from 0 to 1 for calcium (Ca), from 0 to 0.5 for potassium (K), from 0 to 2 for tin (Sn), from 0 to 0.5 for sodium (Na), from 0 to 1.5 for boron (B), from 0 to 2 for titanium (Ti), from 0 to 1 for lead (Pb), from 0 to 2 for zirconium (Zr) and from 0 to 1.5 for yttrium (Y). In the case of X=1 in the above, it indicates a pure metal, which is not transparent and can not be used at all. Further, the upper limit of the range of X is a value showing complete oxidation. In the present invention, generally, oxides of metals other than silicon (Si) and aluminum (Al) are seldom used as packaging materials. There can be preferably used ones having X ranging from 1.0 to 2.0 for silicon (Si), and ranging from 0.5 to 1.5 for aluminum (Al). In the present invention, it is desirable that the thickness of the thin film of the above-mentioned inorganic oxide is arbitrarily selected, for example, within the range of 5 to 200 nm, and preferably within the range of 10 to 100 nm, although it varies depending on the kinds of metal and metal oxide used, and the like. Further, the vapor-deposited film of the inorganic oxide of the present invention may be not only composed of one layer of the vapor-deposited film of the inorganic oxide, but also in the state of a laminate in which two or more layers are laminated. Furthermore, the metals and metal oxides used can be used alone or as a mixture of two or more of them to constitute a thin film in which different inorganic oxides are mixed.

Specific examples of methods for forming the gas barrier coating film of the present invention using the gas barrier coating composition of the present invention include the following methods:

(1) A method of forming the coating film of the present invention on a surface of a substrate, wherein a primer may be previously applied onto the surface of the substrate as described above as needed, followed by formation of the coating film of the present invention;

(2) A method of providing a vapor-deposited film of an inorganic oxide according to the chemical vapor deposition method and/or the physical vapor deposition method on a surface of a substrate, and forming the coating film of the present invention on a surface of the vapor-deposited film, wherein when the vapor-deposited film is formed on the surface of the substrate, a primer may be previously applied onto the surface of the substrate as needed;

(3) A method of forming a vapor-deposited film on a surface of the coating film of the present invention of the above (1) according to the chemical vapor deposition method and/or the physical vapor deposition method;

(4) A method of forming a vapor-deposited film on a surface of the coating film of the present invention of the above (2) according to the chemical vapor deposition method and/or the physical vapor deposition method;

(5) A method of further forming the coating film of the present invention on a surface of the vapor-deposited film of the above (3);

(6) A method of further forming the coating film of the present invention on a surface of the vapor-deposited film of the above (4); and (7) A method of any one of (1) to (6), wherein the surface of the substrate of any one of the above (1) to (6) is one face or both faces.

For laminating the hardened coating film (the coating film of the present invention) formed of the gas barrier coating composition of the present invention on the substrate (including the substrate onto which the above-mentioned vapor-deposited film is laminated) such as a synthetic resin film, the coating film of the present invention having a thickness of 0.01 to 30 µm, preferably 0.1 to 10 µm in the dry state can be formed on the surface of the substrate with a coating means, for example, a roll coater such as a gravure coater, spin coater, a dipping coater, a spray, a brush, a bar coater or an applicator by one application or a plurality of applications. Heating and drying at 50 to 300° C., preferably at 70 to 200° C., for 0.005 to 60 minutes, preferably for 0.01 to 10 minutes, under ordinary circumstances causes condensation, thereby allowing the coating film of the present invention to be formed.

A print pattern layer can be provided on the gas barrier coating film of the present invention if necessary, and a heat-sealing resin layer can be further formed on the print pattern layer if necessary.

The above-mentioned print pattern layer can be constituted by forming a desired print pattern comprising, for example, letters, figures, patterns, symbols and the like, for example, on the above-mentioned coating hardened film, using an ordinary gravure ink composition, an offset ink composition, a letterpress ink composition, a screen ink composition or other ink compositions, by using, for example, a gravure printing system, an offset printing system, a letterpress printing system, a silk screen printing system or other printing systems. In the above-mentioned ink compositions, as vehicles constituting the ink compositions, there can be used, for example, polyolefin resins such as polyethylene resins and chlorinated polypropylene resins, poly(meth)acrylic resins, polyvinyl chloride resins, polyvinyl acetate resins, vinyl chloride-vinyl acetate copolymers, polystyren resins, styrene-butadiene copolymers, vinylidene fluoride resins, polyvinyl alcohol resins, polyvinyl acetal resins, polyvinyl butyral resins, polybutadiene resins, polyester resins, polyamide resins, alkyd resins, epoxy resins, unsaturated polyester resins, thermosetting poly(meth)acrylic resins, melamine resins, urea resins, polyurethane resins, phenol resins, xylene resins, maleic acid resins, cellulose resins such as nitrocellulose, ethyl cellulose, acetyl butyl cellulose and ethyloxyethylcellulose, rubber resins such as chlorinated rubber and cyclized rubber, petroleum resins, natural resins such as rosin and casein, fats and oils such as linseed oil and soybean oil, and other resins. They can be used alone or as a mixture of two or more of them. In the present invention, the vehicles as described above are used alone or as a combination of two or more of them as a main component, and colorants such as dyes and pigments are added thereto alone or as a combination of two or more of them. Further, fillers, stabilizers, plasticizers, antioxidants, light stabilizers such as ultraviolet absorbers, dispersing agents, thickening agents, drying agents, lubricants, antistatic agents, crosslinking agents and other additives can be arbitrarily added thereto if necessary, and ink compositions in various forms obtained by sufficient kneading with solvents, diluents or the like can be used.

Then, heat-sealing resins for forming the above-mentioned heat-sealing resin layers may be any, as long as they melt by heat and can be fused with each other. For example, there can be used one or more of acid-modified polyolefin resins in which polyolefin resins such as low-density polyethylene, intermediate-density polyethylene, high-density polyethylene, straight-chain (linear) low-density polyethylene, polypropylene, ethylene-vinyl acetate copolymers, ionomer resins, ethylene-ethyl acrylate copolymers, ethylene-acrylic acid copolymers, ethylene-methacrylic acid copolymers, ethylene-propylene copolymers, methylpentene polymers, polyethylene and polypropylene are modified with acrylic acid, methacrylic acid, maleic acid, maleic anhydride, fumaric acid, itaconic acid or other unsaturated carboxylic-acids, polyvinyl acetate resins, polyester resins, polystyren resins and other resins. In the present invention, as the heat-sealing resin layer, one or more of the resins as described above are used, and can be used in the state of a resin film or sheet formed, for example, by the inflation method, the T-die method or other methods, or in the state of a coating film according to a resin composition containing one or more of the resins as described above as a main component of a vehicle. It is desirable that the thickness thereof is from about 5 to about 100 μm, and preferably from about 10 to about 50 μm.

In the present invention, of the resins as described above, linear (straight-chain) low-density polyethylene is particularly preferably used. The above-mentioned linear low-density polyethylene has the advantage that the development of a crack seldom occurs to improve impact resistance, because it has tackiness, and is also effective for preventing deterioration of environmental stress cracking resistance, because an inner layer is always in contact with the contents. Further, in the present invention, another resin can be blended with the linear low-density polyethylene. For example, blending of an ethylene-butene copolymer causes the advantage that tearing properties are improved to contribute to easily openable properties, although heat resistance is somewhat inferior and sealing stability tends to deteriorate under high-temperature circumstances. As the linear low-density polyethylene as the heat-sealing resin as described above, there can be used, specifically, an ethylene-α-olefin copolymer polymerized using a metallocene catalyst. For example, there can be used an ethylene-α-olefin copolymer polymerized using a metallocene catalyst such as "Kernel" (trade name) manufactured by Mitsubishi Chemical Corporation, "Evolue" (trade name) manufactured by MITSUI CHEMICALS, INC., "EXACT" (trade name) manufactured by Exxon Chemical, U.S.A., or "AFFINITY" (trade name) or "ENGAGE" (trade name) manufactured by Dow Chemical, U.S.A. When the above-mentioned ethylene-α-olefin copolymer polymerized using the metallocene catalyst is used, it has the advantage that low-temperature heat sealing is possible in producing bags.

In the laminate materials using the gas barrier coating films of the present invention, packaging containers are placed under physically:and chemically severe conditions. Accordingly, the laminate materials constituting the packaging containers need severe packaging suitability, that is to say, various conditions such as deformation preventing strength, drop impact strength, pinhole resistance, heat resistance, sealing performance, quality maintainability, workability, hygienic qualities and others. In the present invention, therefore, materials satisfying the various conditions as described above can be arbitrarily selected and added to the materials constituting the laminate materials to constitute desired laminate materials. For example, such materials can be used, arbitrarily selecting them from films or sheets of known resins such as low-density polyethylene, intermediate-polyethylene, high-density polyethylene, linear low-density polyethylene, polypropylene, ethylene-propylene copolymers, ethylene-vinyl acetate copolymers, ionomer resins, ethylene-ethyl acrylate copolymers, ethylene-acrylic acid or methacrylic acid copolymers, methylpentene polymers, polybutene resins, polyvinyl chloride resins, polyvinyl acetate resins, polyvinylidene chloride resins, vinyl chloride-vinylidene chloride copolymers, poly (meth)acrylic resins, polyacrylonitrile resins, polystyren resins, acrylonitrile-styrene copolymers (ABS resins), acrylonitrile-butadiene-styrene copolymers (ABS resins), polyester resins, polyamide resins, polycarbonate resins, polyvinyl alcohol resins, saponified products of ethylene-vinyl acetate copolymers, fluororesins, diene resins, polyacetal resins, polyurethane resins, nitrocellulose and others. In addition, for example, a cellulose film (cellophane), synthetic paper or the like can also be used. In the present invention, as the above-mentioned films or sheets, any of unstretched and uniaxially or biaxially stretched ones can be used. Although the thickness thereof may be any, it can be selected from the range of several microns to about 300 μm. The above-mentioned films or sheets may be any of films formed by extrusion, films formed by inflation, coating films and the like.

In the present invention, as methods for producing the laminate material relating to the present invention using the barrier film, the print pattern layer, the heat-sealing resin layer and other materials relating to the present invention, there can be used, for example, a dry lamination method of laminating them with intervention of a laminating adhesive layer composed of a laminating adhesive, an extrusion lamination method of laminating them with intervention of an melt-extruded resin layer composed of a melt-extruded adhesive resin, and the like. In the above, as the laminating adhesives, there can be used, for example, one-part or two-part liquid type hardening or non-hardening vinyl, (meth)acrylic, polyamide, polyester, polyether, polyurethane, epoxy, rubber and other laminating adhesives of the solvent type, the aqueous type or the emulsion type. As a coating method of the above-mentioned laminating adhesives, coating can be conducted, for example, by the direct gravure roll coating method, the gravure roll coating method, the kiss coating method, the reverse roll coating method, the fountain method, the transfer roll coating method or other methods. The coating amount thereof is preferably from about 0.1 to about 10 g/m$^2$ (in the dry state), and more preferably from about 1 to about 5 g/m$^2$ (in the dry state). For example, adhesion accelerators such as silane coupling agents can be arbitrarily added to the above-mentioned laminating agents. Further, in the above, as the melt-extruded adhesive resins, the heat-sealing resins forming the above-mentioned heat-sealing resin layers can be similarly used, and low-density polyethylene, particularly linear low-density polyethylene or acid-modified polyethylene, is preferably used. The thickness of the melt-extruded adhesive resin layer composed of the above-mentioned melt-extruded adhesive resin is preferably from about 5 to about 100 μm, and more preferably from about 10 to about 50 μm. When it is necessary to obtain higher adhesive strength in conducting the above-mentioned lamination in the present invention, adhesion improvers such as anchor coating agents can also be applied. As the above-mentioned anchor coating agents, there can be used, for example, organic titanium anchor coating agents such as alkyl titanates, isocyanate anchor coating agents, polyethyleneimine anchor coating agents, polybutadiene anchor coating agents and various other aqueous or oil anchor coating agents. In the present invention, the above-mentioned anchor coating agents are applied by coating methods such as roll coating, gravure coating, knife coating, dip coating, spray coating and others, and solvents and diluents are dried, thereby allowing anchor coating agent layers to be formed. The amount of the above-mentioned anchor coating agent applied is preferably from about 0.1 to about 5 $g/m^2$ (in the dry state).

Of the above-mentioned chemical vapor deposition method and physical vapor deposition method, when vapor deposition is performed by the chemical vapor deposition method, functional groups such as organic ingredients and hydroxyl groups are contained in larger amounts, and the adhesion of the vapor-deposited film to the gas barrier coating layer is raised higher, compared with the case where vapor deposition is performed by the physical vapor deposition method.

The degree of oxygen permeation of the gas barrier coating film of the present invention produced as described above is 1.5 $cm^3/m^2 \cdot atm \cdot 24$ hr or less, at 23° C. and at a relative humidity of 90% RH. The above-mentioned degree of oxygen permeation can be measured, for example, under conditions of 23° C. and 90% RH, using an apparatus for measuring the degree of oxygen permeation (name of kind: MOKON OXTRAN 2/20) manufactured by Modern Controls Inc., U.S.A.

The gas barrier coating films of the present invention and the laminate materials thereof make it possible to make bags or boxes using them, and to produce packaging containers suitable for packing articles in various forms. The packaging containers obtained by using the gas barrier coating films of the present invention are excellent in gas barrier properties to oxygen, water vapor and the like, transparency, heat resistance, impact resistance and the like, have suitability for after-processing such as printing processing, bag-making, box-making processing and the like, and are excellent in packing suitability and storage suitability of various articles such as food and drink, pharmaceuticals, detergents, shampoos, oils, toothpaste, chemicals such as adhesives and tackiness agents, cosmetics and others. The above-mentioned bag-making and box-making methods are illustrated below. For example, in the case of a flexible packaging bag, the laminate material of the above-mentioned gas barrier coating film is used, and faces of the heat-sealing resin layer, an inner layer thereof, are allowed to face each other. It is folded, or the two faces are overlapped with each other, and a peripheral portion thereof is heat-sealed to provide a sealed portion, thereby allowing a bag to be formed. As the bag making method, the above-mentioned laminate material is folded, allowing the inner layer faces thereof to face each other, or the two faces are overlapped with each other, and further, the outer peripheral portion thereof is heat-sealed by the side sealed type, the two-sides sealed type, the three-sides sealed type, the four-sides sealed type, the pile sealed type, the pillow sealed type, the fin sealed type, the even bottom sealed type, the square bottom sealed type or other heat sealing forms to produce various packaging containers. Further, it is also possible to produce self-standing packaging bags (stand-up pouches), tube containers and the like from the above-mentioned laminate material. The above-mentioned heat sealing can be carried out by known methods such as bar sealing, rotary roll sealing, belt sealing, impulse sealing, high-frequency wave sealing and ultrasonic wave, sealing. Further, the above-mentioned packaging containers can be arbitrarily provided, for example, with one-piece type, two-piece type or other bung holes, open-close zippers and the like.

Further, when packaging containers containing paper substrates are produced, laminate materials in which the paper substrates are laminated are produced, and blank plates for producing desired paper containers are produced from the produced laminate materials. Using the above-mentioned blank plates, body portions, bottom portions, head portions and the like are made, and thus, paper containers for liquid of the brick type, the flat type, the Geble top type and the like can be produced. Further, containers in any form, such as cylindrical paper cans such as rectangular containers and circular containers, can be produced. The packaging containers produced as described above can be used for packing various articles such as various kinds of food and drink, chemicals such as adhesives agents and tackiness agents, cosmetics, pharmaceuticals, miscellaneous goods and others.

The gas barrier coating films of the present invention thus obtained are excellent in gas barrier properties even under high-humidity conditions, so that they are not only useful as package materials in food, cigarette and toiletry fields, but also used for applications of solar cells, protective films, moisture-proof films and the like.

EXAMPLES

The present invention will be illustrated with reference to examples in more detail below, but it is to be understood that the present invention is limited to the following examples.

Parts and percentages in the examples are on a weight basis, unless otherwise specified. Further, various evaluation items in the examples were measured according to the following:

Heating Gelation Rate

A coating composition was applied onto a PET film with a 40/10,000-inch applicator, and dried with a dryer (manufactured by Tabai Espec Corp.) at 140° C. for 2 minutes. After the resulting film was isolated using a pincette, 0.25 g thereof was collected in a sample bottle, and a solution thereof in n-propanol/water=1/1 was prepared to a concentration of 0.3%, followed by stirring with a magnetic stirrer at 60° C. for 1 hour. The resulting dispersion was filtered through a paper filter (No. 2), and then, the filtered product was dried under vacuum at 120° C. for 1 hour. The rate of insoluble matter (heating gelation rate) was calculated from the resulting residue.

Appearance of Coating Film

The appearance of a coating film was visually evaluated.

Viscosity of Coating Solution

The viscosity at a solution temperature of 25° C. was measured with a Brookfield type viscometer. The measurement of the viscosity was carried out just after the preparation of a coating composition and after 24 hours.

Degree of Oxygen Permeation

Using a MOCON OXTRAN 2/20 apparatus manufactured by Modern Controls Inc., the measurement was made under an atmosphere of a temperature of 25° C. and a humidity of 90% RH.

Reference Example 1 (Preparation of Titanium Chelate Compound)

To a reactor equipped with a reflux condenser and a stirrer, 100 parts of tetra-i-propoxytitanium and 70 parts of acetylacetone were added, and stirred at 60° C. for 30 minutes to obtain titanium chelate compound (b-1). The purity of this reaction product was 75%.

Reference Example 2 (Preparation of Zirconium Chelate Compound)

To a reactor equipped with a reflux condenser and a stirrer, 100 parts of tetra-n-butoxyzirconium (purity: 100%) and 68 parts of ethyl acetoacetate were added, and stirred at 60° C. for 30 minutes to obtain zirconium chelate compound (b-2). The purity of this reaction product was 77%.

Example 1

100 parts of a 15% solution of an ethylene-vinyl alcohol copolymer (SOARNOL D2630 manufactured by The Nippon Synthetic Chemical Industry Co., Ltd., degree of saponification: 98% or more, ethylene content: 26 mol %, melt flow index: 30 g/10 minutes) as component (a) in water/n-propyl alcohol (water/n-propyl alcohol weight ratio=6/4) and 10 parts of titanium chelate compound (b-1) prepared in Reference Example 1 as component (b) were mixed to obtain coating composition (A). The heating gelation rate of the coating composition of the present invention was 60%.

Example 2

100 parts of a 15% solution of an ethylene-vinyl alcohol copolymer (SOARNOL D2630 manufactured by The Nippon Synthetic Chemical Industry Co., Ltd., degree of saponification: 98% or more, ethylene content: 26 mol %, melt flow index: 30 g/10 minutes) as component (a) in water/n-propyl alcohol/N,N-dimethylformamide (water/n-propyl alcohol/N,N-dimethyl-formamide weight ratio=6/3/1) and 10 parts of titanium chelate compound (b-1) prepared in Reference Example 1 as component (b) were mixed to obtain coating composition (B). The heating gelation rate of coating composition (B) was 55%.

Example 3

A mixture obtained by previously mixing 10 parts of titanium chelate compound (b-1) prepared in Reference Example 1 as component (b) and 10 parts of water and stirring them at room temperature for 1 hour was mixed with 100 parts of a 15% solution of an ethylene-vinyl alcohol copolymer (SOARNOL D2630 manufactured by The Nippon Synthetic Chemical Industry Co., Ltd., degree of saponification: 98% or more, ethylene content: 26 mol %, melt flow index: 30 g/10 minutes) as component (a) in water/n-propyl alcohol/N,N-dimethylformamide (water/n-propyl alcohol/N,N-dimethylformamide weight ratio=6/3/1) to obtain coating composition (C) of the present invention. The heating gelation rate of coating composition (C) was 70%.

Example 4

Coating composition (D) of the present invention was obtained in the same manner as with Example 1 with the exception that 50 parts of colloidal silica (IPA-ST manufactured by Nissan Chemical Industries, Ltd., dispersing medium: isopropyl alcohol, average particle size: 10 nm, solid concentration: 30%) was further added as component (d). The heating gelation rate of coating composition (D) was 60%.

Example 5

Coating composition (E) of the present invention was obtained in the same manner as with Example 1 with the exception that 10 parts of zirconium chelate compound (b-2) prepared in Reference Example 2 was used as component (b). The heating gelation rate of coating composition (E) was 40%.

Example 6

100 parts of a 15% solution of an ethylene-vinyl alcohol copolymer (SOARNOL A3245 manufactured by The Nippon Synthetic Chemical Industry Co., Ltd., degree of saponification: 98% or more, ethylene content: 32 mol %, melt flow index: 45 g/10 minutes) as component (a) in water/n-propyl alcohol (water/n-propyl alcohol weight ratio=3/7) and 10 parts of titanium chelate compound (b-1) prepared in Reference Example 1 as component (b) were mixed to obtain coating composition (F) of the present invention. The heating gelation rate of coating composition (F) was 30%.

Example 7

100 parts of a 5% solution of an ethylene-vinyl alcohol copolymer (SOARNOL D2935 manufactured by The Nippon Synthetic Chemical Industry Co., Ltd., degree of saponification: 98% or more, ethylene content: 29 mol %, melt flow index: 35 g/10 minutes) as component (a) in water/n-propyl alcohol/i-propyl alcohol (water/n-propyl alcohol/i-propyl alcohol weight ratio =38/41/21) was mixed at room temperature with components (b) and (c) obtained by mixing 2 parts of titanium chelate compound (b-1) prepared in Reference Example 1, 6.6 parts of n-propyl alcohol, 3.3 parts of i-propyl alcohol, 6 parts of water and 12.1 parts of N-dimethylformamide and conducting hydrolysis at room temperature for 30 minutes to obtain coating composition (G) of the present invention. The heating gelation rate of coating composition (G) was 70%.

Example 8

100 parts of a 5% solution of an ethylene-vinyl alcohol copolymer (SOARNOL D2935X manufactured by The Nippon Synthetic Chemical Industry Co., Ltd., degree of saponification: 98% or more, ethylene content: 29 mol %, melt flow index: 35 g/10 minutes) as component (a) in water/n-propyl alcohol/i-propyl alcohol (water/n-propyl alcohol/i-propyl alcohol weight ratio =38/41/21) was mixed at room temperature with component (b) obtained by mixing 2 parts of titanium chelate compound (b-1) prepared in Reference Example 1, 18.7 parts of n-propyl alcohol, 3.3 parts of i-propyl alcohol and 6 parts of water and conducting hydrolysis at room temperature for 30 minutes to obtain coating composition (H) of the present invention. The heating gelation rate of coating composition (H) was 65%.

Example 9

100 parts of a 5% solution of an ethylene-vinyl alcohol copolymer (SOARNOL D2935 manufactured by The Nippon Synthetic Chemical Industry Co., Ltd., degree of saponification: 98% or more, ethylene content: 29 mol %, melt flow index: 35 g/10 minutes) as component (a) in water/n-propyl alcohol/i-propyl alcohol (water/n-propyl alcohol/i-propyl alcohol weight ratio =38/41/21) was mixed at room temperature with component (b) obtained by mixing 2 parts of titanium chelate compound (b-1) prepared in Reference Example 1, 12.5 parts of n-propyl alcohol, 1.3 parts of i-propyl alcohol and 4 parts of water and conducting hydrolysis at room temperature for 30 minutes to obtain coating composition (I) of the present invention. The heating gelation rate of coating composition (I) was 40%.

Example 10

100 parts of a 5% solution of an ethylene-vinyl alcohol copolymer (SOARNOL D2935 manufactured by The Nippon Synthetic Chemical Industry Co., Ltd., degree of saponification: 98% or more, ethylene content: 29 mol %, melt flow index: 35 g/10 minutes) as component (a) in water/n-propyl alcohol/i-propyl alcohol (water/n-propyl alcohol/i-propyl alcohol weight ratio =38/41/21) was mixed at room temperature with component (b) obtained by mixing 0.7 part of titanium chelate compound (b-1) prepared in Reference Example 1, 6.4 parts of n-propyl alcohol, 1.1 parts of i-propyl alcohol and 2 parts of water and conducting hydrolysis at room temperature for 30 minutes to obtain coating composition (J) of the present invention. The heating gelation rate of coating composition (J) was 20%.

Example 11

100 parts of a solution containing 5% of an ethylene-vinyl alcohol copolymer (SOARNOL D2935X manufactured by The Nippon Synthetic Chemical Industry Co., Ltd., degree of saponification: 98% or more, ethylene content: 29 mol %, melt flow index: 35 g/10 minutes) as component (a) and 5% of polyvinylpyrrolidone (manufactured by Wako Pure Chemical Industries, Ltd., Mw=25,000) as component (a) in water/n-propyl alcohol/i-propyl alcohol (water/n-propyl alcohol/i-propyl alcohol weight ratio=38/41/21) was mixed at room temperature with component (b) obtained by mixing 2 parts of titanium chelate compound (b-1) prepared in Reference Example 1, 18.7 parts of n-propyl alcohol, 3.3 parts of i-propyl alcohol and 6 parts of water and conducting hydrolysis at room temperature for 30 minutes to obtain coating composition (K) of the present invention. The heating gelation rate of coating composition (K) was 50%.

Example 12

100 parts of a 5% solution of an ethylene-vinyl alcohol copolymer (SOARNOL D2935 manufactured by The Nippon Synthetic Chemical Industry Co., Ltd., degree of saponification: 98% or more, ethylene content: 29 mol %, melt flow index: 35 g/10 minutes) as component (a) in water/n-propyl alcohol (water/n-propyl alcohol weight ratio=40/60) was mixed at 80° C. with (b) obtained by mixing 2 parts of titanium chelate compound (b-1) prepared in Reference Example 1, 16.8 parts of n-propyl alcohol and 11.2 parts of water and conducting hydrolysis at 55° C. for 4 hours, and the resulting mixture was stirred for 2 hours to obtain coating composition (L) of the present invention. The heating gelation rate of coating composition (L) was 5%.

Example 13

100 parts of a solution containing 5% of an ethylene-vinyl alcohol copolymer (SOARNOL D2935 manufactured by The Nippon Synthetic Chemical Industry Co., Ltd., degree of saponification: 98% or more, ethylene content: 29 mol %, melt flow index: 35 g/10 minutes) as component (a) and 5% of polyvinylpyrrolidone (manufactured by Wako Pure Chemical Industries, Ltd., Mw=25,000) as component (c) in water/n-propyl alcohol (water/n-propyl alcohol weight ratio=40/60) was mixed at 80° C. with (b) obtained by mixing 2 parts of titanium chelate compound (b-1) prepared in Reference Example 1, 16.8 parts of n-propyl alcohol and 11.2 parts of water and conducting hydrolysis at 55° C. for 4 hours, and the resulting mixture was stirred for 2 hours to obtain coating composition (M) of the present invention. The heating gelation rate of coating composition (M) was 10%.

Example 14

Gas barrier coating composition (N) was obtained in the same manner as with Example 12 described above with the exception that polyvinyl alcohol (RS Polymer RS-110 manufactured by KURARAY CO., LTD. (degree of saponification=99%, degree of polymerization=1,000)) was used as component (a). The heating gelation rate of coating composition (N) was 30%.

Comparative Example 1

The 15% solution of the ethylene-vinyl alcohol copolymer in water/n-propyl alcohol (water/n-propyl alcohol weight ratio =6/4) used in Example 1 was used as coating composition (α) for comparison. The heating gelation rate of coating composition (α) was 0%.

Comparative Example 2

Coating composition (β) for comparison was obtained in the same manner as with Example 1 with the exception that 40 parts of titanium chelate compound (b-1) prepared in Reference Example 1 was mixed and used as component (b). The heating gelation rate of coating composition (β) was 97%.

Evaluation Examples 1 to 13, Comparative Evaluation Examples 1 and 2

The initial viscosity and the viscosity after 24 hours of the compositions obtained in Examples 1 to 13 and Comparative Examples 1 and 2 were measured. Each composition was applied with a bar coater onto a 12 $\mu$m-thick polyethylene terephthalate (PET) film subjected to corona discharge treatment, and dried with a hot air dryer at 120° C. for 1 minute to form a 1 $\mu$m-thick coating film, thereby obtaining a gas barrier coating material (coating film). The gas barrier properties of the resulting gas barrier coating material were measured by the use of a an apparatus for measuring the degree of oxygen permeation (MOCON OXTRAN 2/20 apparatus manufactured by Modern Controls Inc., at room temperature at a humidity of 90%. Further, the transparency of the coating film was evaluated by visual observation. These results are shown in Tables 1 and 2.

TABLE 1

| | Evaluation Example | | | | | | | |
|---|---|---|---|---|---|---|---|---|
| | 1 | 2 | 3 | 4 | 5 | 6 | 7 | 8 |
| Composition | A | B | C | D | E | F | G | H |
| Appearance of Coating Film | Good | Good | Good | Good | Good | Good | Good | Good |
| Changes with Time in Viscosity of Coating Solution *1 | | | | | | | | |
| Just after Preparation | 200 | 200 | 190 | 180 | 200 | 190 | 15 | 18 |
| After 24 Hours | 230 | 220 | 195 | 220 | 235 | 225 | 15 | 18 |
| Degree of Oxygen Permeation *2 | | | | | | | | |
| Humidity 90% | 1.3 | 1.2 | 1.2 | 1.4 | 1.4 | 1.1 | 1.4 | 1.3 |

*1) The unit of viscosity is mPa · s.
*2) The unit of the degree of oxygen permeation is cc/m$^2$ · atm · 24 hr.

TABLE 2

| | Evaluation Example | | | | | | Comparative Evaluation Example | |
|---|---|---|---|---|---|---|---|---|
| | 9 | 10 | 11 | 12 | 13 | 14 | 1 | 2 |
| Composition | I | J | K | L | M | N | α | β |
| Appearance of Coating Film | Good | Good | Good | Good | Good | Good | Good | Good |
| Changes with Time in Viscosity of Coating Solution *1 | | | | | | | | |
| Just after Preparation | 15 | 18 | 18 | 20 | 15 | 16 | 120 | 200 |
| After 24 Hours | 15 | 20 | 19 | 20 | 16 | 16 | 120 | 800 |
| Degree of Oxygen Permeation *2 | | | | | | | | |
| Humidity 90% | 1.2 | 1.2 | 1.1 | 1.3 | 1.2 | 1.3 | 15.0 | 3.0 |

*1) The unit of viscosity is mPa · s.
*2) The unit of the degree of oxygen permeation is cc/m$^2$ · atm · 24 hr.

Example 15

As component (e), 10 parts of boric acid was added to 100 parts of a 15% solution of an ethylene-vinyl alcohol copolymer (SOARNOL D2630 manufactured by The Nippon Synthetic Chemical Industry Co., Ltd., degree of saponification: 98% or more, ethylene content: 26 mol %, melt flow index: 30 g/10 minutes) as component (a) in water/n-propyl alcohol (water/n-propyl alcohol weight ratio=6/4) and dissolved therein, and then, 10 parts of titanium chelate compound (b-1) prepared in Reference Example 1 was mixed therewith as component (b) to obtain coating composition (AA) of the present invention. The heating gelation rate of the coating composition of the present invention was 70%.

Example 16

As component (e), 5 parts of boric acid was added to 100 parts of a 15% solution of an ethylene-vinyl alcohol copolymer (SOARNOL D2630 manufactured by The Nippon Synthetic Chemical Industry Co., Ltd., degree of saponification: 98% or more, ethylene content: 26 mol %, melt flow index: 30 g/10 minutes) as component (a) in water/n-propyl alcohol/N,N-dimethylformamide (water/n-propyl alcohol/N,N-dimethyl-formamide weight ratio=6/3/1) and dissolved therein, and then, 10 parts of titanium chelate compound (b-1) prepared in Reference Example 1 was mixed therewith as component (b) to obtain coating composition (BB) of the present invention. The heating gelation rate of the coating composition of the present invention was 60%.

Example 17

As component (e), 10 parts of boric acid was added to 100 parts of a 15% solution of an ethylene-vinyl alcohol copolymer (SOARNOL D2908 manufactured by The Nippon Synthetic Chemical Industry Co., Ltd., degree of saponification: 98% or more, ethylene content: 29 mol %, melt flow index: 8 g/10 minutes) as component (a) in water/n-propyl alcohol/ N,N-dimethylformamide (water/n-propyl alcohol/N,N-dimethylformamide weight ratio =6/3/1) and dissolved therein, and then, a mixture obtained by previously mixing 10 parts of titanium chelate compound (b-1) prepared in Reference Example 1 as component (b) and 10 parts of water and stirring them at room temperature for 1 hour was mixed therewith to obtain coating composition (CC) of the present invention. The heating gelation rate of the coating composition of the present invention was 75%.

Example 18

Coating composition (DD) of the present invention was obtained in the same manner as with Example 15 with the exception that 50 parts of colloidal silica (IPA-ST manufactured by Nissan Chemical Industries, Ltd., dispersing medium: isopropyl alcohol, average particle size: 10 nm, solid concentration: 30%) was further added as component (d). The heating gelation rate of the coating composition of the present invention was 70%.

Example 19

Coating composition (EE) of the present invention was obtained in the same manner as with Example 15 with the exception that 10 parts of zirconium chelate compound (b-2) prepared in Reference Example 2 was used as component (b). The heating gelation rate of coating composition (E) was 50%.

Example 20

As component (e), 5 parts of boric acid was added to 100 parts of a 15% solution of an ethylene-vinyl alcohol copolymer (SOARNOL A3245 manufactured by The Nippon Synthetic Chemical Industry Co., Ltd., degree of saponification: 98% or more, ethylene content: 32 mol %, melt flow index: 45 g/10 minutes) as component (a) in water/n-propyl alcohol (water/n-propyl alcohol weight ratio=3/7) and dissolved therein, and then, 10 parts of titanium chelate compound (b-1) prepared in Reference Example 1 was mixed therewith as component (b) to obtain coating composition (FF) of the present invention. The heating gelation rate of the coating composition of the present invention was 40%.

Example 21

100 parts of a 5% solution of an ethylene-vinyl alcohol copolymer (SOARNOL D2935 manufactured by The Nippon Synthetic Chemical Industry Co., Ltd., degree of saponification: 98% or more, ethylene content: 29 mol %, melt flow index: 35 g/10 minutes) as component (a) in water/n-propyl alcohol/i-propyl alcohol (water/n-propyl alcohol/i-propyl alcohol weight ratio =38/41/21), component (b) obtained by mixing 2 parts of titanium chelate compound (b-1) prepared in Reference Example 1, 6.6 parts of n-propyl alcohol, 3.3 parts of i-propyl alcohol, 6 parts of water and 12.1 parts of N-dimethylformamide as component (c) and conducting hydrolysis at room temperature for 30 minutes, and 10 parts of a 5% aqueous solution of boric acid as component (e) were mixed at room temperature to obtain coating composition (GG) of the present invention. The heating gelation rate of the coating composition of the present invention was 75%.

Example 22

100 parts of a 5% solution of an ethylene-vinyl alcohol copolymer (component (a)) (SOARNOL D2935 manufactured by The Nippon Synthetic Chemical Industry Co., Ltd., degree of saponification: 98% or more, ethylene content: 29 mol %, melt flow index: 35 g/10 minutes) in water/n-propyl alcohol/i-propyl alcohol (water/n-propyl alcohol/i-propyl alcohol weight ratio =38/41/21) containing 2% of boric acid as component (e) was mixed at room temperature with component (b) obtained by mixing 2 parts of titanium chelate compound (b-1) prepared in Reference Example 1, 18.7 parts of n-propyl alcohol, 3.3 parts of i-propyl alcohol and 6 parts of water and conducting hydrolysis at room temperature for 30 minutes to obtain coating composition (HH) of the present invention. The heating gelation rate of the coating composition of the present invention was 70%.

Example 23

100 parts of a 5% solution of an ethylene-vinyl alcohol copolymer (component (a)) (SOARNOL D2935 manufactured by The Nippon Synthetic Chemical Industry Co., Ltd., degree of saponification: 98% or more, ethylene content: 29 mol %, melt flow index: 35 g/10 minutes) in water/n-propyl alcohol/i-propyl alcohol (water/n-propyl alcohol/i-propyl alcohol weight ratio =38/41/21) containing 5% of boric acid as component (e) was mixed at room temperature with (b) obtained by mixing 2 parts of titanium chelate compound (b-1) prepared in Reference Example 1, 12.5 parts of n-propyl alcohol, 1.3 parts of i-propyl alcohol and 4 parts of water and conducting hydrolysis at room temperature for 30 minutes to obtain coating composition (II) of the present invention. The heating gelation rate of the coating composition of the present invention was 45%.

Example 24

100 parts of a 5% solution of an ethylene-vinyl alcohol copolymer (component (a)) (SOARNOL D2935 manufactured by The Nippon Synthetic Chemical Industry Co., Ltd., degree of saponification: 98% or more, ethylene content: 29 mol %, melt flow index: 35 g/10 minutes) in water/n-propyl alcohol/i-propyl alcohol (water/n-propyl alcohol/i-propyl alcohol weight ratio =38/41/21) containing 5% of boric acid as component (e), component (b) obtained by mixing 0.7 part of titanium chelate compound (b-1) prepared in Reference Example 1, 6.4 parts of n-propyl alcohol, 1.1 parts of i-propyl alcohol and 2 parts of water and conducting hydrolysis at room temperature for 30 minutes, and 12.1 parts of N,N-dimethylformamide as component (c) were mixed at room temperature to obtain coating composition (JJ) of the present invention. The heating gelation rate of the coating composition of the present invention was 30%.

Example 25

100 parts of a solution containing 5% of an ethylene-vinyl alcohol copolymer (component (a)) (SOARNOL D2935 manufactured by The Nippon Synthetic Chemical Industry Co., Ltd., degree of saponification: 98% or more, ethylene content: 29 mol %, melt flow index: 35 g/10 minutes) containing 5% of boric acid as component (e), and 5% of polyvinylpyrrolidone (manufactured by Wako Pure Chemical Industries, Ltd., Mw=25,000) as component (c) in water/n-propyl alcohol/i-propyl alcohol (water/n-propyl alcohol/i-propyl alcohol weight ratio=38/41/21) was mixed at room temperature with component (b) obtained by mixing 2 parts of titanium chelate compound (b-1) prepared in Reference Example 1, 18.7 parts of n-propyl alcohol, 3.3 parts of i-propyl alcohol and 6 parts of water and conducting hydrolysis at room temperature for 30 minutes to obtain coating composition (KK) of the present invention. The heating gelation rate of the coating composition of the present invention was 60%.

Example 26

100 parts of a 5% solution of an ethylene-vinyl alcohol copolymer (component (a)) (SOARNOL D2935 manufactured by The Nippon Synthetic Chemical Industry Co., Ltd., degree of saponification: 98% or more, ethylene content: 29 mol %, melt flow index: 35 g/10 minutes) containing 5% of boric acid as component (e) in water/n-propyl alcohol (water/n-propyl alcohol weight ratio=40/60) was mixed at 40° C. with (b) obtained by mixing 2 parts of titanium chelate compound (b-1) prepared in Reference Example 1, 16.8 parts of n-propyl alcohol and 11.2 parts of water and conducting hydrolysis at 55° C. for 4 hours, and the resulting mixture was stirred for 2 hours to obtain coating composition (LL) of the present invention. The heating gelation rate of the coating composition of the present invention was 10%.

Example 27

100 parts of a 5% solution of an ethylene-vinyl alcohol copolymer (component (a)) (SOARNOL D2935 manufactured by The Nippon Synthetic Chemical Industry Co., Ltd., degree of saponification: 98% or more, ethylene content: 29 mol %, melt flow index: 35 g/10 minutes) in water/n-propyl alcohol (water/n-propyl alcohol weight ratio=40/60) containing 5% of boric acid as component (e), component (b) obtained by mixing 2 parts of titanium chelate compound (b-1) prepared in Reference Example 1, 16.8 parts of n-propyl alcohol and 11.2 parts of water and conducting hydrolysis at 55° C. for 4 hours, and 12.1 parts of N,N-dimethylformamide as component (c) were mixed at 40° C., and stirred for 2 hours to obtain coating composition (MM) of the present invention. The heating gelation rate of the coating composition of the present invention was 15%.

Example 28

Gas barrier coating composition (NN) was obtained in the same manner as with Example 26 described above with the exception that polyvinyl alcohol (RS Polymer RS-110 manufactured by KURARAY CO., LTD. (degree of saponification=99%, degree of polymerization=1,000)) was used as component (a). The heating gelation rate of the coating composition of the present invention was 40%.

Evaluation Examples 15 to 28

The initial viscosity and the viscosity after 24 hours of the compositions obtained in Examples 15 to 28 were measured. Each composition was applied with a bar coater onto a 12 μm-thick polyethylene terephthalate (PET) film subjected to corona discharge treatment, and dried with a hot air dryer at 120° C. for 1 minute to form a 1 μm-thick coating film, thereby obtaining a gas barrier coating material (coating film). The gas barrier properties of the resulting gas barrier coating material were measured by the use of a an apparatus for measuring the degree of oxygen permeation (MOCON OXTRAN 2/20 apparatus manufactured by Modern Controls Inc., at room temperature at a humidity of 90%. Further, the transparency of the coating film was evaluated by visual observation. These results are shown in Tables 3 and 4.

TABLE 3

| | Evaluation Example | | | | | | | |
|---|---|---|---|---|---|---|---|---|
| | 15 | 16 | 17 | 18 | 19 | 20 | 21 | 22 |
| Composition | AA | BB | CC | DD | EE | FF | GG | HH |
| Appearance of Coating Film | Good | Good | Good | Good | Good | Good | Good | Good |
| Changes with Time in Viscosity of Coating Solution *1 | | | | | | | | |
| Just after Preparation | 200 | 200 | 190 | 180 | 200 | 190 | 15 | 18 |
| After 24 Hours. | 230 | 220 | 195 | 220 | 235 | 225 | 15 | 18 |
| After 1 Month | 240 | 240 | 200 | 210 | 230 | 249 | 14 | 20 |
| Degree of Oxygen Permeation *2 | | | | | | | | |
| Humidity 90% | 1.3 | 1.2 | 1.2 | 1.4 | 1.4 | 1.1 | 1.4 | 1.3 |
| Appearance of Coating Solution after 1 Month | Clear | Clear | Clear | Clear | Clear | Clear | Clear | Clear |

*1) The unit of viscosity is mPa · s.
*2) The unit of the degree of oxygen permeation is cc/m² · atm · 24 hr.

TABLE 4

| | Evaluation Example | | | | | |
|---|---|---|---|---|---|---|
| | 23 | 24 | 25 | 26 | 27 | 28 |
| Composition | II | JJ | KK | LL | MM | NN |
| Appearance of Coating Film | Good | Good | Good | Good | Good | Good |
| Changes with Time in Viscosity of Coating Solution *1 | | | | | | |
| Just after Preparation | 15 | 18 | 18 | 20 | 15 | 20 |
| After 24 Hours. | 15 | 20 | 19 | 20 | 16 | 20 |
| After 1 Month | 18 | 20 | 20 | 20 | 20 | 20 |

TABLE 4-continued

| | Evaluation Example | | | | | |
|---|---|---|---|---|---|---|
| | 23 | 24 | 25 | 26 | 27 | 28 |
| Degree of Oxygen Permeation *2 | | | | | | |
| Humidity 90% | 1.2 | 1.2 | 1.1 | 1.3 | 1.2 | 1.2 |
| Appearance of Coating Solution after 1 Month | Clear | Clear | Clear | Clear | Clear | Clear |

*1) The unit of viscosity is mPa · s.
*2) The unit of the degree of oxygen permeation is cc/m² · atm · 24 hr.

Example 29

(1) A 12 μm-thick biaxially stretched polyethylene terephthalate-film was used as a substrate, and this was mounted on a delivery roll of a plasma chemical vapor deposition apparatus. Then, a 0.012 μm-thick vapor-deposited film of silicon oxide was formed on one face of the above-mentioned biaxially stretched polyethylene terephthalate film under the following conditions.

(Vapor Deposition Conditions)

Mixing ratio of reaction gases: hexamethyldisiloxane:oxygen gas:helium=1:10:10 (unit: slm)

Degree of vacuum in a vacuum chamber: $5.5 \times 10^{-6}$ mbar

Degree of vacuum in a vapor deposition chamber: $6.5 \times 10^{-2}$ mbar

Electric power supplied to a cooling-electrode drum: 18 kW

Transferring speed of a film: 80 m/minute

Vapor-deposited face: corona-treated face (2) Then, corona treatment was conducted under the following conditions on a face of the vapor-deposited film of silicon oxide of the biaxially stretched polyethylene terephthalate film on which the vapor-deposited film of silicon oxide was formed above. As a result, the surface tension of the surface of the vapor-deposited film of silicon oxide was improved from 35 dynes to 62 dynes.

Output: 10 kW

Treating speed: 100 m/minute (3) Then, using the biaxially stretched polyethylene terephthalate film on which the corona-treated vapor-deposited film of silicon oxide was formed above, the corona-treated face of the vapor-deposited film of silicon oxide was coated with gas barrier coating composition (L) obtained in Example 12, by the gravure roll coating method, using a gravure printing machine and arranging a gravure coating roll for the first color. Thus, a coating film having a thickness of 0.5 g/m$^2$ (in the dry state) was formed. Then, a hardened coating film was formed by heat treatment at 120° C. for 2 minutes to produce a gas barrier coating film of the present invention. Then, in succession, a desired multi-color print pattern layer was formed on the hardened coating film of the above-mentioned gas barrier coating film, using the above-mentioned gravure printing machine and a gravure ink composition.

(4) Then, the biaxially stretched polyethylene terephthalate film on which the print pattern layer was formed above was mounted on a first delivery roll of a dry laminating machine, and a face of the print pattern layer was coated with a two-part hardening type polyurethane adhesive for lamination at a rate of 4.5 g/m$^2$ (in the dry state) to form an adhesive layer for lamination according to the gravure roll coating method. Then, a 70 μm-thick low-density polyethylene film was dry laminated onto a face of the above-mentioned adhesive layer for lamination to produce a laminate material. The oxygen permeability of this laminate material was 0.2 cm$^3$/m$^2$·atm·24 hr.

Example 30

(1) A 20 μm-thick biaxially stretched polypropylene film (manufactured by Futamura Chemical Industries, CO., Ltd., trade name: GH-1, one side corona-treated product) was used as a substrate, and this was mounted on a delivery roll of a plasma chemical vapor deposition apparatus. Then, a 0.015 μm-thick vapor-deposited film of silicon oxide was formed on one face of the above-mentioned biaxially stretched polypropylene film under the following conditions.
(Vapor Deposition Conditions)

Mixing ratio of reaction gases: hexamethyldisiloxane:oxygen gas:helium=1:11:10 (unit: slm)

Degree of vacuum in a vacuum chamber: 5.2×10$^{-6}$ mbar

Degree of vacuum in a vapor deposition chamber: 5.1× 10$^{-2}$ mbar

Electric power supplied to a cooling-electrode drum: 18 kW

Transferring speed of a film: 70 m/minute

Vapor-deposited face: corona-treated face (2) Then, corona treatment was conducted under the following conditions on a face of the vapor-deposited film of silicon oxide of the biaxially stretched polypropylene film on which the vapor-deposited film of silicon oxide was formed above. As a result, the surface tension of the surface of the vapor-deposited film of silicon oxide was improved from 42 dynes to 65 dynes.

Output: 10 kW

Treating speed: 100 m/minute (3) Then, using the biaxially stretched polypropylene film on which the corona-treated vapor-deposited film of silicon oxide was formed above, the corona-treated face of the vapor-deposited film of silicon oxide was coated with gas barrier coating composition (H) obtained in Example 8, by the gravure roll coating method, using a gravure printing machine and arranging a gravure coating roll for the first color. Thus, a coating film having a thickness of 0.9 g/m$^2$ (in the dry state) was formed. Then, a hardened coating film was formed by heat treatment at 100° C. for 3 minutes to produce a gas barrier coating film of the present invention. Then, in succession, a desired multi-color print pattern layer was formed on the hardened coating film of the above-mentioned gas barrier coating film, using the above-mentioned gravure printing machine and a gravure ink composition.

(4) Then, the biaxially stretched polypropylene film on which the print pattern layer was formed above was mounted on a first delivery roll of a dry laminating machine, and a face of the print pattern layer was coated with a two-part hardening type polyurethane adhesive for lamination at a rate of 4.5 g/m$^2$ (in the dry state) to form an adhesive layer for lamination according to the gravure roll coating method. Then, a 70 μm-thick unstretched polypropylene film was dry laminated onto a face of the above-mentioned adhesive layer for lamination to produce a laminate material. The oxygen permeability of this laminate material was 0.6 cm$^3$/m$^2$·atm·24 hr.

Example 31

(1) A 15 μm-thick biaxially stretched nylon film was used as a substrate, and this was mounted on a delivery roll of a plasma chemical vapor deposition apparatus. Then, a 0.015 μm-thick vapor-deposited film of silicon oxide was formed on one face of the above-mentioned biaxially stretched nylon film under the following conditions.
(Vapor Deposition Conditions)

Mixing ratio of reaction gases: hexamethyldisiloxane:oxygen gas:helium=1:11:10 (unit: slm)

Degree of vacuum in a vacuum chamber: 5.2×10$^{-6}$ mbar

Degree of vacuum in a vapor deposition chamber: 5.1× 10$^{-2}$ mbar

Electric power supplied to a cooling-electrode drum: 18 kW

Transferring speed of a film: 70 m/minute

Vapor-deposited face: corona-treated face (2) Then, corona treatment was conducted under the following conditions on a face of the vapor-deposited face of silicon oxide of the biaxially stretched nylon film on which the vapor-deposited film of silicon oxide was formed above. As a result, the surface tension of the surface of the vapor-deposited film of silicon oxide was improved from 42 dynes to 65 dynes.

Output: 10 kW

Treating speed: 100 m/minute (3) Then, using the biaxially stretched nylon film on which the corona-treated vapor-deposited film of silicon oxide was formed above, the corona-treated face of the vapor-deposited film of silicon oxide was coated with gas barrier coating composition (M) obtained in Example 13, by the gravure roll coating method, using a gravure printing machine and arranging a gravure coating roll for the first color. Thus, a coating film having a thickness of 0.5 g/m$^2$ (in the dry state) was formed. Then, a hardened coating film was formed by heat treatment at 120° C. for 1 minute to produce a gas barrier coating film of the present invention. Then, in succession, a desired multi-color print pattern layer was formed on the hardened coating film of the above-mentioned gas barrier coating film, using the above-mentioned gravure printing machine and a gravure ink composition.

(4) Then, the biaxially stretched nylon film on which the print pattern layer was formed above was mounted on a first delivery roll of a dry laminating machine, and a face of the print pattern layer was coated with a two-part hardening type polyurethane adhesive for lamination at a rate of 4.5 g/m$^2$ (in the dry state) to form an adhesive layer for lamination according to the gravure roll coating method. Then, a 70 μm-thick unstretched polypropylene film was dry laminated onto a face of the above-mentioned adhesive layer for lamination to produce a laminate material. The oxygen permeability of this laminate material was 0.5 cm³/m²·atm·24 hr.

Example 32

A laminate material was produced in the entirely same manner as with Example 29 described above with the exception that the biaxially stretched polyethylene terephthalate film on which the print pattern was formed was mounted on a first delivery roll of an extrusion laminating machine, and a 70 μm-thick low-density polyethylene film was extrusion laminated onto the face of the print pattern layer while melt extruding low-density polyethylene for melt extrusion to a thickness of 20 μm, instead of dry laminating the 70 μm-thick low-density polyethylene film onto the face of the print pattern layer of the biaxially stretched polyethylene terephthalate film on which the print pattern layer was formed, with intervention of the laminating adhesive layer to produce the laminate material in (4) of Example 29 described above. The oxygen permeability of this laminate material was 0.3 cm³/m²·atm·24 hr.

Example 33

A laminate material was produced in the entirely same manner as with Example 30 described above with the exception that the biaxially stretched polypropylene film on which the print pattern was formed was mounted on a first delivery roll of an extrusion laminating machine, and a 70 μm-thick low-density polyethylene film was extrusion laminated onto the face of the print pattern layer while melt extruding low-density polyethylene for melt extrusion to a thickness of 20 μm, instead of dry laminating the 70 μm-thick unstretched polypropylene film onto the face of the print pattern layer of the biaxially stretched polypropylene film on which the print pattern layer was formed, with intervention of the laminating adhesive layer to produce the laminate material in (4) of Example 30 described above. The oxygen permeability of this laminate material was 0.8 cm³/m²·atm·24 hr.

Example 34

A laminate material was produced in the entirely same manner as with Example 31 described above with the exception that the biaxially stretched nylon film on which the print pattern was formed was mounted on a first delivery roll of an extrusion laminating machine, and a 70 μm-thick low-density polyethylene film was extrusion laminated onto the face of the print pattern layer while melt extruding low-density polyethylene for melt extrusion to a thickness of 20 μm, instead of dry laminating the 70 μm-thick unstretched polypropylene film onto the face of the print pattern layer of the biaxially stretched nylon film on which the print pattern layer was formed, with intervention of the laminating adhesive layer to produce the laminate material in (4) of Example 31 described above. The oxygen permeability of this laminate material was 0.6 cm³/m²·atm·24 hr.

Example 35

(1) A 12 μm-thick biaxially stretched polyethylene terephthalate film was used as a substrate, and this was mounted on a delivery roll of a take-up type vacuum vapor deposition apparatus. Then, the above-mentioned film was drawn out onto a coating drum. Using aluminum as a vapor deposition source, a 0.02 μm-thick vapor-deposited film of aluminum oxide was formed on the above-mentioned biaxially stretched polyethylene terephthalate film while supplying oxygen gas, by the oxidation reaction vacuum vapor deposition method according to the electron beam (EB) heating system.

(Vapor Deposition Conditions)

Vapor Deposition Source: aluminum

Degree of vacuum in a vacuum chamber: $5.2 \times 10^{-6}$ mbar

Degree of vacuum in a vapor deposition chamber: $1.1 \times 10^{-6}$ mbar

EB output: 40 kW

Transferring speed of a film: 600 m/minute

Vapor-deposited face: corona-treated face (2) Then, corona treatment was conducted under the following conditions on a face of the vapor-deposited film of aluminum oxide of the biaxially stretched polyethylene terephthalate film on which the vapor-deposited film of aluminum oxide was formed above. As a result, the surface tension of the surface of the vapor-deposited film of aluminum oxide was improved from 45 dynes to 60 dynes.

Output: 10 kW

Treating speed: 100 m/minute (3) Then, using the biaxially stretched polyethylene terephthalate film on which the corona-treated vapor-deposited film of aluminum oxide was formed above, the corona-treated face of the vapor-deposited film of aluminum oxide was coated with gas barrier coating composition (L) obtained in Example 12, by the gravure roll coating method, using a gravure printing machine and arranging a gravure coating roll for the first color. Thus, a coating film having a thickness of 0.9 g/m² (in the dry state) was formed. Then, a hardened coating film was formed by heat treatment at 120° C. for 1 minute to produce a gas barrier coating film of the present invention. Then, in succession, a desired multi-color print pattern layer was formed on the hardened coating film of the above-mentioned gas barrier coating film, using the above-mentioned gravure printing machine and a gravure ink composition.

(4) Then, the biaxially stretched polyethylene terephthalate film on which the print pattern layer was formed above was mounted on a first delivery roll of a dry laminating machine, and a face of the print pattern layer was coated with a two-part hardening type polyurethane adhesive for lamination at a rate of 4.5 g/m² (in the dry state) to form an adhesive layer for lamination according to the gravure roll coating method. Then, a 70 μm-thick low-density polyethylene film was dry laminated onto a face of the above-mentioned adhesive layer for lamination to produce a laminate material. The oxygen permeability of this laminate material was 0.2 cm³/m²·atm·24 hr.

Example 36

(1) A 20 μm-thick biaxially stretched polypropylene film (manufactured by Futamura Chemical Industries, CO., Ltd., trade name: GH-1, one side corona-treated product) was used as a substrate, and this was mounted on a delivery roll of a take-up type vacuum vapor deposition apparatus. Then, the above-mentioned film was drawn out onto a coating drum. Using aluminum as a vapor deposition source, a 0.02 μm-thick vapor-deposited film of aluminum oxide was formed on the above-mentioned biaxially stretched polypropylene film while supplying oxygen gas, by the oxidation reaction vacuum vapor deposition method according to the electron beam (EB) heating system.

(Vapor Deposition Conditions)
Vapor Deposition Source: aluminum
Degree of vacuum in a vacuum chamber: $8.2 \times 10^{-6}$ mbar
Degree of vacuum in a vapor deposition chamber: $1.0 \times 10^{-6}$ mbar
EB output: 40 kW
Transferring speed of a film: 500 m/minute (2) Then, corona treatment was conducted under the following conditions on a face of the vapor-deposited film of aluminum oxide of the biaxially stretched polypropylene film on which the vapor-deposited film of aluminum oxide was formed above. As a result, the surface tension of the surface of the vapor-deposited film of aluminum oxide was improved from 47 dynes to 62 dynes.
Output: 10 kW
Treating speed: 100 m/minute (3) Then, using the biaxially stretched polypropylene film on which the corona-treated vapor-deposited film of aluminum oxide was formed above, the corona-treated face of the vapor-deposited film of aluminum oxide was coated with gas barrier coating composition (M) obtained in Example 13, by the gravure roll coating method, using a gravure printing machine and arranging a gravure coating roll for the first color. Thus, a coating film having a thickness of 0.5 g/m$^2$ (in the dry state) was formed. Then, a hardened coating film was formed by heat treatment at 100° C. for 3 minutes to produce a gas barrier coating film of the present invention. Then, in succession, a desired multi-color print pattern layer was formed on the hardened coating film of the above-mentioned gas barrier coating film, using the above-mentioned gravure printing machine and a gravure ink composition.

(4) Then, the biaxially stretched polypropylene film on which the print pattern layer was formed above was mounted on a first delivery roll of a dry laminating machine, and a face of the print pattern layer was coated with a two-part hardening type polyurethane adhesive for lamination at a rate of 4.5 g/m$^2$ (in the dry state) to form an adhesive layer for lamination according to the gravure roll coating method. Then, a 70 μm-thick unstretched polypropylene film was dry laminated onto a face of the above-mentioned adhesive layer for lamination to produce a laminate material. The oxygen permeability of this laminate material was 0.6 cm$^3$/m$^2$·atm·24 hr. Example 37

(1) A 15 μm-thick biaxially stretched nylon film was used as a substrate, and this was mounted on a delivery roll of a take-up type vacuum vapor deposition apparatus. Then, the above-mentioned film was drawn out onto a coating drum. Using aluminum as a vapor deposition source, a 0.02 μm-thick vapor-deposited film of aluminum oxide was formed on the above-mentioned biaxially stretched nylon film while supplying oxygen gas, by the oxidation reaction vacuum vapor deposition method according to the electron beam (EB) heating system.

(Vapor Deposition Conditions)
Vapor Deposition Source: aluminum
Degree of vacuum in a vacuum chamber: $7.2 \times 10^{-6}$ mbar
Degree of vacuum in a vapor deposition chamber: $1.0 \times 10^{-6}$ mbar
EB output: 40 kW
Transferring speed of a film: 500 m/minute
Vapor-deposited face: corona-treated face (2) Then, corona treatment was conducted under the following conditions on a face of the vapor-deposited film of aluminum oxide of the biaxially stretched nylon film on which the vapor-deposited film of aluminum oxide was formed above. As a result, the surface tension of the surface of the vapor-deposited film of aluminum oxide was improved from 45 dynes to 60 dynes.
Output: 10 kW
Treating speed: 100 m/minute (3) Then, using the biaxially stretched nylon film on which the corona-treated vapor-deposited film of aluminum oxide was formed above, the corona-treated face of the vapor-deposited film of aluminum oxide was coated with gas barrier coating composition (H) obtained in Example 8, by the gravure roll coating method, using a gravure printing machine and arranging a gravure coating roll for the first color. Thus, a coating film having a thickness of 0.5 g/m$^2$ (in the dry state) was formed. Then, a hardened coating film was formed by heat treatment at 120° C. for 2 minutes to produce a gas barrier coating film of the present invention. Then, in succession, a desired multi-color print pattern layer was formed on the hardened coating film of the above-mentioned gas barrier coating film, using the above-mentioned gravure printing machine and a gravure ink composition.

(4) Then, the biaxially stretched nylon film on which the print pattern layer was formed above was mounted on a first delivery roll of a dry laminating machine, and a face of the print pattern layer was coated with a two-part hardening type polyurethane adhesive for lamination at a rate of 4.5 g/m$^2$ (in the dry state) to form an adhesive layer for lamination according to the gravure roll coating method. Then, a 70 μm-thick unstretched polypropylene film was dry laminated onto a face of the above-mentioned adhesive layer for lamination to produce a laminate material. The oxygen permeability of this laminate material was 0.5 cm$^3$/m$^2$·atm·24 hr.

Example 38

A laminate material was produced in the entirely same manner as with Example 35 described above with the exception that the biaxially stretched polyethylene terephthalate film on which the print pattern was formed was mounted on a first delivery roll of an extrusion laminating machine, and a 70 μm-thick low-density polyethylene film was extrusion laminated onto the face of the print pattern layer while melt extruding low-density polyethylene for melt extrusion to a thickness of 20 μm, instead of dry laminating the 70 μm-thick low-density polyethylene film onto the face of the print pattern layer of the biaxially stretched polyethylene terephthalate film on which the print pattern layer was formed, with intervention of the laminating adhesive layer to produce the laminate material in (4) of Example 35 described above. The oxygen permeability of this laminate material was 0.3 cm$^3$/m$^2$·atm·24 hr.

Example 39

A laminate material was produced in the entirely same manner as with Example 36 described above with the exception that the biaxially stretched polypropylene film on which the print pattern was formed was mounted on a first delivery roll of an extrusion laminating machine, and a 70 μm-thick low-density polyethylene film was extrusion laminated onto the face of the print pattern layer while melt extruding low-density polyethylene for melt extrusion to a thickness of 20 μm, instead of dry laminating the 70 μm-thick unstretched polypropylene film onto the face of the print pattern layer of the biaxially stretched polypropylene film on which the print pattern layer was formed, with intervention of the laminating adhesive layer to produce the laminate material in (4) of Example 36 described above. The oxygen permeability of this laminate material was 0.8 cm$^3$/m$^2$·atm·24 hr.

Example 40

A laminate material was produced in the entirely same manner as with Example 37 described above with the exception that the biaxially stretched nylon film on which the print pattern was formed was mounted on a first delivery roll of an extrusion laminating machine, and a 70 μm-thick low-density polyethylene film was extrusion laminated onto the face of the print pattern layer while melt extruding low-density polyethylene for melt extrusion to a thickness of 20 μm, instead of dry laminating the 70 μm-thick unstretched polypropylene film onto the face of the print pattern layer of the biaxially stretched nylon film on which the print pattern layer was formed, with intervention of the laminating adhesive layer to produce the laminate material in (4) of Example 37 described above. The oxygen permeability of this laminate material was 0.6 cm$^3$/m$^2$·atm·24 hr.

Example 41

(1) A 12 μm-thick biaxially stretched polyethylene terephthalate film was used as a substrate, and this was mounted on a delivery roll of a plasma chemical vapor deposition apparatus. Then, a 0.012 μm-thick vapor-deposited film of silicon oxide was formed on one face of the above-mentioned biaxially stretched polyethylene terephthalate film under the following conditions.
(Vapor Deposition Conditions)

Mixing ratio of reaction gases: hexamethyldisiloxane:oxygen gas:helium=1:10:10 (unit: slm)

Degree of vacuum in a vacuum chamber: 5.5×10$^{-6}$ mbar

Degree of vacuum in a vapor deposition chamber: 6.5×10$^{-2}$ mbar

Electric power supplied to a cooling-electrode drum: 18 kW

Transferring speed of a film: 80 m/minute

Vapor-deposited face: corona-treated face (2) Then, using the biaxially stretched polyethylene terephthalate film on which the vapor-deposited film of silicon oxide was formed above, this was mounted on a delivery roll of a take-up type vacuum vapor deposition apparatus, and drawn out onto a coating drum. Using aluminum as a vapor deposition source, a 0.02 μm-thick vapor-deposited film of aluminum oxide was formed on the above-mentioned vapor-deposited film of silicon oxide of the biaxially stretched polyethylene terephthalate film on which the vapor-deposited film of silicon oxide was formed, while supplying oxygen gas, by the reaction vacuum vapor deposition method according to the electron beam (EB) heating system. Further, corona treatment was conducted on a face of the above-mentioned vapor-deposited film of aluminum oxide under the following conditions. As a result, the surface tension of the surface of the vapor-deposited film of aluminum oxide was improved from 40 dynes to 65 dynes.

Output: 10 kW

Treating speed: 100 m/minute (3) Then, using the biaxially stretched polyethylene terephthalate film on which the vapor-deposited film of aluminum oxide and the vapor-deposited film of silicon oxide were formed above, the face of the vapor-deposited film of aluminum oxide was coated with gas barrier coating composition (L) obtained in Example 12, which was used for the first color, by the gravure roll coating method, using a gravure printing machine and arranging a gravure coating roll for the first color. Thus, a coating film having a thickness of 1.0 g/m$^2$ (in the dry state) was formed. Then, a hardened coating film was formed by heat treatment at 120° C. for 1 minute to produce a gas barrier coating film of the present invention. Then, in succession, a desired multi-color print pattern layer was formed on the hardened coating film of the above-mentioned gas barrier coating film, using the above-mentioned gravure printing machine and a gravure ink composition.

(4) Then, the biaxially stretched polyethylene terephthalate film on which the print pattern layer was formed above was mounted on a first delivery roll of a dry laminating machine, and a face of the print pattern layer was coated with a two-part hardening type polyurethane adhesive for lamination at a rate of 4.5 g/m$^2$ (in the dry state) to form an adhesive layer for lamination according to the gravure roll coating method. Then, a 70 μm-thick low-density polyethylene film was dry laminated onto a face of the above-mentioned adhesive layer for lamination to produce a laminate material. The oxygen permeability of this laminate material was 0.2 cm$^3$/m$^2$·atm·24 hr.

Example 42

(1) A 20 μm-thick biaxially stretched polypropylene film (manufactured by Futamura Chemical Industries, CO., Ltd., trade name: GH-1, one side corona-treated product) was used as a substrate, and this was mounted on a delivery roll of a plasma chemical vapor deposition apparatus. Then, a 0.015 μm-thick vapor-deposited film of silicon oxide was formed on one face of the above-mentioned biaxially stretched polypropylene film under the following conditions.
(Vapor Deposition Conditions)

Mixing ratio of reaction gases: hexamethyldisiloxane:oxygen gas:helium=1:11:10 (unit: slm)

Degree of vacuum in a vacuum chamber: 5.2×10$^{-6}$ mbar

Degree of vacuum in a vapor deposition chamber: 5.1×10$^{-2}$ mbar

Electric power supplied to a cooling-electrode drum: 18 kW

Transferring speed of a film: 70 m/minute

Vapor-deposited face: corona-treated face (2) Then, using the biaxially stretched polypropylene film on which the vapor-deposited film of silicon oxide was formed above, this was mounted on a delivery roll of a take-up type vacuum vapor deposition apparatus, and drawn out onto a coating drum. Using aluminum as a vapor deposition source, a 0.02 μm-thick vapor-deposited film of aluminum oxide was formed on the above-mentioned vapor-deposited film of silicon oxide of the biaxially stretched polypropylene film on which the vapor-deposited film of silicon oxide was formed, while supplying oxygen gas, by the reaction vacuum vapor deposition method according to the electron beam (EB) heating system. Further, corona treatment was conducted on a face of the above-mentioned vapor-deposited film of aluminum oxide under the following conditions. As a result, the surface tension of the surface of the vapor-deposited film of aluminum oxide was improved from 42 dynes to 65 dynes.

Output: 10 kW

Treating speed: 100 m/minute (3) Then, using the biaxially stretched polypropylene film on which the vapor-deposited film of aluminum oxide and the vapor-deposited film of silicon oxide were formed above, the face of the vapor-deposited film of aluminum oxide was coated with gas barrier coating composition (G) obtained in Example 7, by the gravure roll coating method, using a gravure printing machine and arranging a gravure coating roll for the first color. Thus, a coating film having a thickness of 0.8 g/m² (in the dry state) was formed. Then, a hardened coating film was formed by heat treatment at 120° C. for 1 minute to produce a gas barrier coating film of the present invention. Then, in succession, a desired multi-color print pattern layer was formed on the hardened coating film of the above-mentioned gas barrier coating film, using the above-mentioned gravure printing machine and a gravure ink composition.

(4) Then, the biaxially stretched polypropylene film on which the print pattern layer was formed above was mounted on a first delivery roll of a dry laminating machine, and a face of the print pattern layer was coated with a two-part hardening type polyurethane adhesive for lamination at a rate of 4.5 g/m² (in the dry state) to form an adhesive layer for lamination according to the gravure roll coating method. Then, a 70 μm-thick unstretched polypropylene film was dry laminated onto a face of the above-mentioned adhesive layer for lamination to produce a laminate material. The oxygen permeability of this laminate material was 0.5 cm³/m²·atm·24 hr.

Example 43

(1) A 15 μm-thick biaxially stretched nylon film was used as a substrate, and this was mounted on a delivery roll of a plasma chemical vapor deposition apparatus. Then, a 0.015 μm-thick vapor-deposited film of silicon oxide was formed on one face of the above-mentioned biaxially stretched nylon film under the following conditions.
(Vapor Deposition Conditions)

Mixing ratio of reaction gases: hexamethyldisiloxane:oxygen gas:helium=1:11:10 (unit: slm)

Degree of vacuum in a vacuum chamber: 5.2×10⁻⁶ mbar

Degree of vacuum in a vapor deposition chamber: 5.1×10⁻² mbar

Electric power supplied to a cooling-electrode drum: 18 kW

Transferring speed of a film: 70 m/minute

Vapor-deposited face: corona-treated face (2) Then, using the biaxially stretched nylon film on which the vapor-deposited film of silicon oxide was formed above, this was mounted on a delivery roll of a take-up type vacuum vapor deposition apparatus, and drawn out onto a coating drum. Using aluminum as a vapor deposition source, a 0.02 μm-thick vapor-deposited film of aluminum oxide was formed on the above-mentioned vapor-deposited film of silicon oxide of the biaxially stretched nylon film on which the vapor-deposited film of silicon oxide was formed, while supplying oxygen gas, by the reaction vacuum vapor deposition method according to the electron beam (EB) heating system. Further, corona treatment was conducted on a face of the above-mentioned vapor-deposited film of aluminum oxide under the following conditions. As a result, the surface tension of the surface of the vapor-deposited film of aluminum oxide was improved from 45 dynes to 65 dynes.

Output: 10 kW

Treating speed: 100 m/minute (3) Then, using the biaxially stretched nylon film on which the vapor-deposited film of aluminum oxide and the vapor-deposited film of silicon oxide were formed above, the face of the vapor-deposited film of aluminum oxide was coated with gas barrier coating composition (L) obtained in Example 12, by the gravure roll coating method, using a gravure printing machine and arranging a gravure coating roll for the first color. Thus, a coating film having a thickness of 1.2 g/m² (in the dry state) was formed. Then, a hardened coating film was formed by heat treatment at 120° C. for 2 minutes to produce a gas barrier coating film of the present invention. Then, in succession, a desired multi-color print pattern layer was formed on the hardened coating film of the above-mentioned gas barrier coating film, using the above-mentioned gravure printing machine and a gravure ink composition.

(4) Then, the biaxially stretched nylon film on which the print pattern layer was formed above was mounted on a first delivery roll of a dry laminating machine, and a face of the print pattern layer was coated with a two-part hardening type polyurethane adhesive for lamination at a rate of 4.5 g/m² (in the dry state) to form an adhesive layer for lamination according to the gravure roll coating method. Then, a 70 μm-thick unstretched polypropylene film was dry laminated onto a face of the above-mentioned adhesive layer for lamination to produce a laminate material. The oxygen permeability of this laminate material was 0.4 cm³/m²·atm·24 hr.

Example 44

A laminate material was produced in the entirely same manner as with Example 41 described above with the exception that the biaxially stretched polyethylene terephthalate film on which the print pattern was formed was mounted on a first delivery roll of an extrusion laminating machine, and a 70 μm-thick low-density polyethylene film was extrusion laminated onto the face of the print pattern layer while melt extruding low-density polyethylene for melt extrusion to a thickness of 20 μm, instead of dry laminating the 70 μm-thick low-density polyethylene film onto the face of the print pattern layer of the biaxially stretched polyethylene terephthalate film on which the print pattern layer was formed, with intervention of the laminating adhesive layer to produce the laminate material in (4) of Example 41 described above. The oxygen permeability of this laminate material was 0.2 cm³/m²·atm·24 hr.

Example 45

A laminate material was produced in the entirely same manner as with Example 42 described above with the exception that the biaxially stretched polypropylene film on which the print pattern was formed was mounted on a first delivery roll of an extrusion laminating machine, and a 70 μm-thick low-density polyethylene film was extrusion laminated onto the face of the print pattern layer while melt extruding low-density polyethylene for melt extrusion to a thickness of 20 μm, instead of dry laminating the 70 μm-thick unstretched polypropylene film onto the face of the print pattern layer of the biaxially stretched polypropylene film on which the print pattern layer was formed, with intervention of the laminating adhesive layer to produce the laminate material in (4) of Example 42 described above. The oxygen permeability of this laminate material was 0.6 cm³/m²·atm·24 hr.

Example 46

A laminate material was produced in the entirely same manner as with Example 43 described above with the exception that the biaxially stretched nylon film on which the print pattern was formed was mounted on a first delivery roll of an extrusion laminating machine, and a 70 μm-thick low-density polyethylene film was extrusion laminated onto the face of the print pattern layer while melt extruding low-density polyethylene for melt extrusion to a thickness of 20 μm, instead of dry laminating the 70 μm-thick unstretched polypropylene film onto the face of the print pattern layer of the biaxially stretched nylon film on which the print pattern layer was formed, with intervention of the laminating adhesive layer to produce the laminate material in (4) of Example 43 described above. The oxygen permeability of this laminate material was 0.5 cm$^3$/m$^2$·atm·24 hr.

Example 47

A laminate material was produced in the same manner as with Example 42 described above with the exception that gas barrier coating composition (N) was used in (3) of Example 42. The oxygen permeability of this laminate material was 0.4 cm$^3$/m$^2$·atm·24 hr.

Example 48

(1) A 12 μm-thick biaxially stretched polyethylene terephthalate film was used as a substrate, and this was mounted on a delivery roll of a plasma chemical vapor deposition apparatus. Then, a 0.012 μm-thick vapor-deposited film of silicon oxide was formed on one face of the above-mentioned biaxially stretched polyethylene terephthalate film under the following conditions.
(Vapor Deposition Conditions)
  Mixing ratio of reaction gases: hexamethyldisiloxane:oxygen gas:helium=1:10:10 (unit: slm)
  Degree of vacuum in a vacuum chamber: 5.5×10$^{-6}$ mbar
  Degree of vacuum in a vapor deposition chamber: 6.5× 10$^{-2}$ mbar
  Electric power supplied to a cooling-electrode drum: 18 kW
  Transferring speed of a film: 80 m/minute
  Vapor-deposited face: corona-treated face
(2) Then, corona treatment was conducted under the following conditions on a face of the vapor-deposited film of silicon oxide of the biaxially stretched polyethylene terephthalate film on which the vapor-deposited film of silicon oxide was formed above. As a result, the surface tension of the surface of the vapor-deposited film of silicon oxide was improved from 35 dynes to 62 dynes.
  Output: 10 kW
  Treating speed: 100 m/minute
(3) Then, using the biaxially stretched polyethylene terephthalate film on which the corona-treated vapor-deposited film of silicon oxide was formed above, the corona-treated face of the vapor-deposited film of silicon oxide was coated with gas barrier coating composition (LL) obtained in Example 26, by the gravure roll coating method, using a gravure printing machine and arranging a gravure coating roll for the first color. Thus, a coating film having a thickness of 0.5 g/m$^2$ (in the dry state) was formed. Then, a hardened coating film was formed by heat treatment at 120° C. for 2 minutes to produce a gas barrier coating film of the present invention. Then, in succession, a desired multi-color print pattern layer was formed on the hardened coating film of the above-mentioned gas barrier coating film, using the above-mentioned gravure printing machine and a gravure ink composition.
(4) Then, the biaxially stretched polyethylene terephthalate film on which the print pattern layer was formed above was mounted on a first delivery roll of a dry laminating machine, and a face of the print pattern layer was coated with a two-part hardening type polyurethane adhesive for lamination at a rate of 4.5 g/m$^2$ (in the dry state) to form an adhesive layer for lamination according to the gravure roll coating method. Then, a 70 μm-thick low-density polyethylene film was dry laminated onto a face of the above-mentioned adhesive layer for lamination to produce a laminate material. The oxygen permeability of this laminate material was 0.2 cm$^3$/m$^2$·atm·24 hr.

Example 49

(1) A 20 μm-thick biaxially stretched polypropylene film (manufactured by Futamura Chemical Industries, CO., Ltd., trade name: GH-1, one side corona-treated product) was used as a substrate, and this was mounted on a delivery roll of a plasma chemical vapor deposition apparatus. Then, a 0.015 μm-thick vapor-deposited film of silicon oxide was formed on one face of the above-mentioned biaxially stretched polypropylene film under the following conditions.
(Vapor Deposition Conditions)
  Mixing ratio of reaction gases: hexamethyldisiloxane:oxygen gas:helium=1:11:10 (unit: slm)
  Degree of vacuum in a vacuum chamber: 5.2×10$^{-6}$ mbar
  Degree of vacuum in a vapor deposition chamber: 5.1× 10$^{-2}$ mbar
  Electric power supplied to a cooling-electrode drum: 18 kW
  Transferring speed of a film: 70 m/minute
  Vapor-deposited face: corona-treated face
(2) Then, corona treatment was conducted under the following conditions on a face of the vapor-deposited film of silicon oxide of the biaxially stretched polypropylene film on which the vapor-deposited film of silicon oxide was formed above. As a result, the surface tension of the surface of the vapor-deposited film of silicon oxide was improved from 42 dynes to 65 dynes.
  Output: 10 kW
  Treating speed: 100 m/minute
(3) Then, using the biaxially stretched polypropylene film on which the corona-treated vapor-deposited film of silicon oxide was formed above, the corona-treated face of the vapor-deposited film of silicon oxide was coated with gas barrier coating composition (HH) obtained in Example 22, by the gravure roll coating method, using a gravure printing machine and arranging a gravure coating roll for the first color. Thus, a coating film having a thickness of 0.9 g/m$^2$ (in the dry state) was formed. Then, a hardened coating film was formed by heat treatment at 100° C. for 3 minutes to produce a gas barrier coating film of the present invention. Then, in succession, a desired multi-color print pattern layer was formed on the hardened coating film of the above-mentioned gas barrier coating film, using the above-mentioned gravure printing machine and a gravure ink composition.
(4) Then, the biaxially stretched polypropylene film on which the print pattern layer was formed above was mounted on a first delivery roll of a dry laminating machine, and a face of the print pattern layer was coated with a two-part hardening type polyurethane adhesive for lamination at a rate of 4.5 g/m$^2$ (in the dry state) to form an adhesive layer for lamination according to the gravure roll coating method. Then, a 70 μm-thick unstretched polypropylene film was dry laminated onto a face of the above-mentioned adhesive layer for lamination to produce a laminate material. The oxygen permeability of this laminate material was 0.6 cm$^3$/m$^2$·atm·24 hr.

Example 50

(1) A 15 μm-thick biaxially stretched nylon film was used as a substrate, and this was mounted on a delivery roll of a plasma chemical vapor deposition apparatus. Then, a 0.015 μm-thick vapor-deposited film of silicon oxide was formed on one face of the above-mentioned biaxially stretched nylon film under the following conditions.

(Vapor Deposition Conditions)

Mixing ratio of reaction gases: hexamethyldisiloxane:oxygen gas:helium=1:11:10 (unit: slm)

Degree of vacuum in a vacuum chamber: $5.2 \times 10^{-6}$ mbar

Degree of vacuum in a vapor deposition chamber: $5.1 \times 10^{-2}$ mbar

Electric power supplied to a cooling-electrode drum: 18 kW

Transferring speed of a film: 70 m/minute

Vapor-deposited face: corona-treated face (2) Then, corona treatment was conducted under the following conditions on a face of the vapor-deposited face of silicon oxide of the biaxially stretched nylon film on which the vapor-deposited film of silicon oxide was formed above. As a result, the surface tension of the surface of the vapor-deposited film of silicon oxide was improved from 42 dynes to 65 dynes.

Output: 10 kW

Treating speed: 100 m/minute (3) Then, using the biaxially stretched nylon film on which the corona-treated vapor-deposited film of silicon oxide was formed above, the corona-treated face of the vapor-deposited film of silicon oxide was coated with gas barrier coating composition (MM) obtained in Example 27, by the gravure roll coating method, using a gravure printing machine and arranging a gravure coating roll for the first color. Thus, a coating film having a thickness of 0.5 g/m² (in the dry state) was formed. Then, a hardened coating film was formed by heat treatment at 120° C. for 1 minute to produce a gas barrier coating film of the present invention. Then, in succession, a desired multi-color print pattern layer was formed on the hardened coating film of the above-mentioned gas barrier coating film, using the above-mentioned gravure printing machine and a gravure ink composition.

(4) Then, the biaxially stretched nylon film on which the print pattern layer was formed above was mounted on a first delivery roll of a dry laminating machine, and a face of the print pattern layer was coated with a two-part hardening type polyurethane adhesive for lamination at a rate of 4.5 g/m² (in the dry state) to form an adhesive layer for lamination according to the gravure roll coating method. Then, a 70 μm-thick unstretched polypropylene film was dry laminated onto a face of the above-mentioned adhesive layer for lamination to produce a laminate material. The oxygen permeability of this laminate material was 0.5 cm³/m²·atm·24 hr.

Example 51

A laminate material was produced in the entirely same manner as with Example 48 described above with the exception that the biaxially stretched polyethylene terephthalate film on which the print pattern was formed was mounted on a first delivery roll of an extrusion laminating machine, and a 70 μm-thick low-density polyethylene film was extrusion laminated onto the face of the print pattern layer while melt extruding low-density polyethylene for melt extrusion to a thickness of 20 μm, instead of dry laminating the 70 μm-thick low-density polyethylene film onto the face of the print pattern layer of the biaxially stretched polyethylene terephthalate film on which the print pattern layer was formed, with intervention of the laminating adhesive layer to produce the laminate material in (4) of Example 48 described above. The oxygen permeability of this laminate material was 0.3 cm³/m²·atm·24 hr.

Example 52

A laminate material was produced in the entirely same manner as with Example 49 described above with the exception that the biaxially stretched polypropylene film on which the print pattern was formed was mounted on a first delivery roll of an extrusion laminating machine, and a 70 μm-thick low-density polyethylene film was extrusion laminated onto the face of the print pattern layer while melt extruding low-density polyethylene for melt extrusion to a thickness of 20 μm, instead of dry laminating the 70 μm-thick unstretched polypropylene film onto the face of the print pattern layer of the biaxially stretched polypropylene film on which the print pattern layer was formed, with intervention of the laminating adhesive layer to produce the laminate material in (4) of Example 49 described above. The oxygen permeability of this laminate material was 0.8 cm³/m²·atm·24 hr.

Example 53

A laminate material was produced in the entirely same manner as with Example 50 described above with the exception that the biaxially stretched nylon film on which the print pattern was formed was mounted on a first delivery roll of an extrusion laminating machine, and a 70 μm-thick low-density polyethylene film was extrusion laminated onto the face of the print pattern layer while melt extruding low-density polyethylene for melt extrusion to a thickness of 20 μm, instead of dry laminating the 70 μm-thick unstretched polypropylene film onto the face of the print pattern layer of the biaxially stretched nylon film on which the print pattern layer was formed, with intervention of the laminating adhesive layer to produce the laminate material in (4) of Example 50 described above. The oxygen permeability of this laminate material was 0.6 cm³/m²·atm·24 hr.

Example 54

(1) A 12 μm-thick biaxially stretched polyethylene terephthalate film was used as a substrate, and this was mounted on a delivery roll of a take-up type vacuum vapor deposition apparatus. Then, the above-mentioned film was drawn out onto a coating drum. Using aluminum as a vapor deposition source, a 0.02 μm-thick vapor-deposited film of aluminum oxide was formed on the above-mentioned biaxially stretched polyethylene terephthalate film while supplying oxygen gas, by the oxidation reaction vacuum vapor deposition method according to the electron beam (EB) heating system.

(Vapor Deposition Conditions)

Vapor Deposition Source: aluminum

Degree of vacuum in a vacuum chamber: $5.2 \times 10^{-6}$ mbar

Degree of vacuum in a vapor deposition chamber: $1.1 \times 10^{-6}$ mbar

EB output: 40 kW

Transferring speed of a film: 600 m/minute

Vapor-deposited face: corona-treated face (2) Then, corona treatment was conducted under the following conditions on a face of the vapor-deposited film of aluminum oxide of the biaxially stretched polyethylene terephthalate film on which the vapor-deposited film of aluminum oxide was formed above. As a result, the surface tension of the surface of the vapor-deposited film of aluminum oxide was improved from 45 dynes to 60 dynes.

Output: 10 kW

Treating speed: 100 m/minute (3) Then, using the biaxially stretched polyethylene terephthalate film on which the corona-treated vapor-deposited film of aluminum oxide was formed above, the corona-treated face of the vapor-deposited film of aluminum oxide was coated with gas barrier coating composition (LL) obtained in Example 26, by the gravure roll coating method, using a gravure printing machine and arranging a gravure coating roll for the first color. Thus, a coating film having a thickness of 0.9 g/m$^2$ (in the dry state) was formed. Then, a hardened coating film was formed by heat treatment at 120° C. for 1 minute to produce a gas barrier coating film of the present invention. Then, in succession, a desired multi-color print pattern layer was formed on the hardened coating film of the above-mentioned gas barrier coating film, using the above-mentioned gravure printing machine and a gravure ink composition.

(4) Then, the biaxially stretched polyethylene terephthalate film on which the print pattern layer was formed above was mounted on a first delivery roll of a dry laminating machine, and a face of the print pattern layer was coated with a two-part hardening type polyurethane adhesive for lamination at a rate of 4.5 g/m$^2$ (in the dry state) to form an adhesive layer for lamination according to the gravure roll coating method. Then, a 70 μm-thick low-density polyethylene film was dry laminated onto a face of the above-mentioned adhesive layer for lamination to produce a laminate material. The oxygen permeability of this laminate material was 0.2 cm$^3$/m$^2$·atm·24 hr.

Example 55

(1) A 20 μm-thick biaxially stretched polypropylene film (manufactured by Futamura Chemical Industries, CO., Ltd., trade name: GH-1, one side corona-treated product) was used as a substrate, and this was mounted on a delivery roll of a take-up type vacuum vapor deposition apparatus. Then, the above-mentioned film was drawn out on to a coating drum. Using aluminum as a vapor deposition source, a 0.02 μm-thick vapor-deposited film of aluminum oxide was formed on the above-mentioned biaxially stretched polypropylene film while supplying oxygen gas, by the oxidation reaction vacuum vapor deposition method according to the electron beam (EB) heating system.

(Vapor Deposition Conditions)

Vapor Deposition Source: aluminum

Degree of vacuum in a vacuum chamber: 8.2×10$^{-6}$ mbar

Degree of vacuum in a vapor deposition chamber: 1.0× 10$^{-6}$ mbar

EB output: 40 kW

Transferring speed of a film: 500 m/minute (2) Then, corona treatment was conducted under the following conditions on a face of the vapor-deposited film of aluminum oxide of the biaxially stretched polypropylene film on which the vapor-deposited film of aluminum oxide was formed above. As a result, the surface tension of the surface of the vapor-deposited film of aluminum oxide was improved from 47 dynes to 62 dynes.

Output: 10 kW

Treating speed: 100 m/minute (3) Then, using the biaxially stretched polypropylene film on which the corona-treated vapor-deposited film of aluminum oxide was formed above, the corona-treated face of the vapor-deposited film of aluminum oxide was coated with gas barrier coating composition (MM) obtained in Example 27, by the gravure roll coating method, using a gravure printing machine and arranging a gravure coating roll for the first color. Thus, a coating film having a thickness of 0.5 g/m$^2$ (in the dry state) was formed. Then, a hardened coating film was formed by heat treatment at 100° C. for 3 minutes to produce a gas barrier coating film of the present invention. Then, in succession, a desired multi-color print pattern layer was formed on the hardened coating film of the above-mentioned gas barrier coating film, using the above-mentioned gravure printing machine and a gravure ink composition.

(4) Then, the biaxially stretched polypropylene film on which the print pattern layer was formed above was mounted on a first delivery roll of a dry laminating machine, and a face of the print pattern layer was coated with a two-part hardening type polyurethane adhesive for lamination at a rate of 4.5 g/m$^2$ (in the dry state) to form an adhesive layer for lamination according to the gravure roll coating method. Then, a 70 μm-thick unstretched polypropylene film was dry laminated onto a face of the above-mentioned adhesive layer for lamination to produce a laminate material. The oxygen permeability of this laminate material was 0.6 cm$^3$/m$^2$·atm·24 hr.

Example 56

(1) A 15 μm-thick biaxially stretched nylon film was used as a substrate, and this was mounted on a delivery roll of a take-up type vacuum vapor deposition apparatus. Then, the above-mentioned film was drawn out onto a coating drum. Using aluminum as a vapor deposition source, a 0.02 μm-thick vapor-deposited film of aluminum oxide was formed on the above-mentioned biaxially stretched nylon film while supplying oxygen gas, by the oxidation reaction vacuum vapor deposition method according to the electron beam (EB) heating system.

(Vapor Deposition Conditions)

Vapor Deposition Source: aluminum

Degree of vacuum in a vacuum chamber: 7.2×10$^{-6}$ mbar

Degree of vacuum in a vapor deposition chamber: 1.0× 10$^{-6}$ mbar

EB output: 40 kW

Transferring speed of a film: 500 m/minute (2) Then, corona treatment was conducted under the following conditions on a face of the vapor-deposited film of aluminum oxide of the biaxially stretched nylon film on which the vapor-deposited film of aluminum oxide was formed above. As a result, the surface tension of the surface of the vapor-deposited film of aluminum oxide was improved from 45 dynes to 60 dynes.

Output: 10 kW

Treating speed: 100 m/minute (3) Then, using the biaxially stretched nylon film on which the corona-treated vapor-deposited film of aluminum oxide was formed above, the corona-treated face of the vapor-deposited film of aluminum oxide was coated with gas barrier coating composition (HH) obtained in Example 22, by the gravure roll coating method, using a gravure printing machine and arranging a gravure coating roll for the first color. Thus, a coating film having a thickness of 1.2 g/m$^2$ (in the dry state) was formed. Then, a hardened coating film was formed by heat treatment at 120° C. for 2 minutes to produce a gas barrier coating film of the present invention. Then, in succession, a desired multi-color print pattern layer: was formed on the hardened coating film of the above-mentioned gas barrier coating film, using the above-mentioned gravure printing machine and a gravure ink composition.

(4) Then, the biaxially stretched nylon film on which the print pattern layer was formed above was mounted on a first delivery roll of a dry laminating machine, and a face of the print pattern layer was coated with a two-part hardening type polyurethane adhesive for lamination at a rate of 4.5 g/m$^2$ (in the dry state) to form an adhesive layer for lamination according to the gravure roll coating method. Then, a 70 $\mu$m-thick unstretched polypropylene film was dry laminated onto a face of the above-mentioned adhesive layer for lamination to produce a laminate material. The oxygen permeability of this laminate material was 0.5 cm$^3$/m$^2$·atm·24 hr.

Example 57

A laminate material was produced in the entirely same manner as with Example 54 described above with the exception that the biaxially stretched polyethylene terephthalate film on which the print pattern was formed was mounted on a first delivery roll of an extrusion laminating machine, and a 70 $\mu$m-thick low-density polyethylene film was extrusion laminated onto the face of the print pattern layer while melt extruding low-density polyethylene for melt extrusion to a thickness of 20 $\mu$m, instead of dry laminating the 70 $\mu$m-thick low-density polyethylene film onto the face of the print pattern layer of the biaxially stretched polyethylene terephthalate film on which the print pattern layer was formed, with intervention of the laminating adhesive layer to produce the laminate material in (4) of Example 54 described above. The oxygen permeability of this laminate material was 0.3 cm$^3$/m$^2$·atm·24 hr.

Example 58

A laminate material was produced in the entirely same manner as with Example 55 described above with the exception that the biaxially stretched polypropylene film on which the print pattern was formed was mounted on a first delivery roll of an extrusion laminating machine, and a 70 $\mu$m-thick low-density polyethylene film was extrusion laminated onto the face of the print pattern layer while melt extruding low-density polyethylene for melt extrusion to a thickness of 20 $\mu$m, instead of dry laminating the 70 $\mu$m-thick unstretched polypropylene film onto the face of the print pattern layer of the biaxially stretched polypropylene film on which the print pattern layer was formed, with intervention of the laminating adhesive layer to produce the laminate material in (4) of Example 55 described above. The oxygen permeability of this laminate material was 0.8 cm$^3$/m$^2$·atm·24 hr.

Example 59

A laminate material was produced in the entirely same manner as with Example 56 described above with the exception that the biaxially stretched nylon film on which the print pattern was formed was mounted on a first delivery roll of an extrusion laminating machine, and a 70 $\mu$m-thick low-density polyethylene film was extrusion laminated onto the face of the print pattern layer while melt extruding low-density polyethylene for melt extrusion to a thickness of 20 $\mu$m, instead of dry laminating the 70 $\mu$m-thick unstretched polypropylene film onto the face of the print pattern layer of the biaxially stretched nylon film on which the print pattern layer was formed, with intervention of the laminating adhesive layer to produce the laminate material in (4) of Example 56 described above. The oxygen permeability of this laminate material was 0.6 cm$^3$/m$^2$·atm·24 hr.

Example 60

(1) A 12 $\mu$m-thick biaxially stretched polyethylene terephthalate film was used as a substrate, and this was mounted on a delivery roll of a plasma chemical vapor deposition apparatus. Then, a 0.012 $\mu$m-thick vapor-deposited film of silicon oxide was formed on one face of the above-mentioned biaxially stretched polyethylene terephthalate film under the following conditions.

(Vapor Deposition Conditions)

Mixing ratio of reaction gases: hexamethyldisiloxane:oxygen gas:helium=1:10:10 (unit: slm)

Degree of vacuum in a vacuum chamber: 5.5×10$^{-6}$ mbar

Degree of vacuum in a vapor deposition chamber: 6.5×10$^{-2}$ mbar

Electric power supplied to a cooling-electrode drum: 18 kW

Transferring speed of a film: 80 m/minute

Vapor-deposited face: corona-treated face (2) Then, using the biaxially stretched polyethylene terephthalate film on which the vapor-deposited film of silicon oxide was formed above, this was mounted on a delivery roll of a take-up type vacuum vapor deposition apparatus, and drawn out on to a coating drum. Using aluminum as a vapor deposition source, a 0.02 $\mu$m-thick vapor-deposited film of aluminum oxide was formed on the above-mentioned vapor-deposited film of silicon oxide of the biaxially stretched polyethylene terephthalate film on which the vapor-deposited film of silicon oxide was formed, while supplying oxygen gas, by the reaction vacuum vapor deposition method according to the electron beam (EB) heating system. Further, corona treatment was conducted on a face of the above-mentioned vapor-deposited film of aluminum oxide under the following conditions. As a result, the surface tension of the surface of the vapor-deposited film of aluminum oxide was improved from 40 dynes to 65 dynes.

Output: 10 kW

Treating speed: 100 m/minute (3) Then, using the biaxially stretched polyethylene terephthalate film on which the vapor-deposited film of aluminum oxide and the vapor-deposited film of silicon oxide were formed above, the face of the vapor-deposited film of aluminum oxide was coated with gas barrier coating composition (LL) obtained in Example 26, which was used for the first color, by the gravure roll coating method, using a gravure printing machine and arranging a gravure coating roll for the first color. Thus, a coating film having a thickness of 1.0 g/m$^2$ (in the dry state) was formed. Then, a hardened coating film was formed by heat treatment at 120° C. for 1 minute to produce a gas barrier coating film of the present invention. Then, in succession, a desired multi-color print pattern layer was formed on the hardened coating film of the above-mentioned gas barrier coating film, using the above-mentioned gravure printing machine and a gravure ink composition.

(4) Then, the biaxially stretched polyethylene terephthalate film on which the print pattern layer was formed above was mounted on a first delivery roll of a dry laminating machine, and a face of the print pattern layer was coated with a two-part hardening type polyurethane adhesive for lamination at a rate of 4.5 g/m$^2$ (in the dry state) to form an adhesive layer for lamination according to the gravure roll coating method. Then, a 70 μm-thick low-density polyethylene film was dry laminated onto a face of the above-mentioned adhesive layer for lamination to produce a laminate material. The oxygen permeability of this laminate material was 0.2 cm$^3$/m$^2$·atm·24 hr.

Example 61

(1) A 20 μm-thick biaxially stretched polypropylene film (manufactured by Futamura Chemical Industries, CO., Ltd., trade name: GH-1, one side corona-treated product) was used as a substrate, and this was mounted on a delivery roll of a plasma chemical vapor deposition apparatus. Then, a 0.015 μm-thick vapor-deposited film of silicon oxide was formed on one face of the above-mentioned biaxially stretched polypropylene film under the following conditions.
(Vapor Deposition Conditions)
   Mixing ratio of reaction gases: hexamethyldisiloxane:oxygen gas:helium=1:11:10 (unit: slm)
   Degree of vacuum in a vacuum chamber: 5.2×10$^{-6}$ mbar
   Degree of vacuum in a vapor deposition chamber: 5.1×10$^{-2}$ mbar
   Electric power supplied to a cooling-electrode drum: 18 kW
   Transferring speed of a film: 70 m/minute
   Vapor-deposited face: corona-treated face
(2) Then, using the biaxially stretched polypropylene film on which the vapor-deposited film of silicon oxide was formed above, this was mounted on a delivery roll of a take-up type vacuum vapor deposition apparatus, and drawn out onto a coating drum. Using aluminum as a vapor deposition source, a 0.02 μm-thick vapor-deposited film of aluminum oxide was formed on the above-mentioned vapor-deposited film of silicon oxide of the biaxially stretched polypropylene film on which the vapor-deposited film of silicon oxide was formed, while supplying oxygen gas, by the reaction vacuum vapor deposition method according to the electron beam (EB) heating system. Further, corona treatment was conducted on a face of the above-mentioned vapor-deposited film of aluminum oxide under the following conditions. As a result, the surface tension of the surface of the vapor-deposited film of aluminum oxide was improved from 42 dynes to 65 dynes.
   Output: 10 kW
   Treating speed: 100 m/minute
(3) Then, using the biaxially stretched polypropylene film on which the vapor-deposited film of aluminum oxide and the vapor-deposited film of silicon oxide were formed above, the face of the vapor-deposited film of aluminum oxide was coated with gas barrier coating composition (GG) obtained in Example 21, by the gravure roll coating method, using a gravure printing machine and arranging a gravure coating roll for the first color. Thus, a coating film having a thickness of 0.8 g/m$^2$ (in the dry state) was formed. Then, a hardened coating film was formed by heat treatment at 120° C. for 1 minute to produce a gas barrier coating film of the present invention. Then, in succession, a desired multi-color print pattern layer was formed on the hardened coating film of the above-mentioned gas barrier coating film, using the above-mentioned gravure printing machine and a gravure ink composition.
(4) Then, the biaxially stretched polypropylene film on which the print pattern layer was formed above was mounted on a first delivery roll of a dry laminating machine, and a face of the print pattern layer was coated with a two-part hardening type polyurethane adhesive for lamination at a rate of 4.5 g/m$^2$ (in the dry state) to form an adhesive layer for lamination according to the gravure roll coating method. Then, a 70 μm-thick unstretched polypropylene film was dry laminated onto a face of the above-mentioned adhesive layer for lamination to produce a laminate material. The oxygen permeability of this laminate material was 0.5 cm$^3$/m$^2$·atm·24 hr.

Example 62

(1) A 15 μm-thick biaxially stretched nylon film was used as a substrate, and this was mounted on a delivery roll of a plasma chemical vapor deposition apparatus. Then, a 0.015 μm-thick vapor-deposited film of silicon oxide was formed on one face of the above-mentioned biaxially stretched nylon film under the following conditions.
(Vapor Deposition Conditions)
   Mixing ratio of reaction gases: hexamethyldisiloxane:oxygen gas:helium=1:11:10 (unit: slm)
   Degree of vacuum in a vacuum chamber: 5.2×10$^{-6}$ mbar
   Degree of vacuum in a vapor deposition chamber: 5.1×10$^{-2}$ mbar
   Electric power supplied to a cooling-electrode drum: 18 kW
   Transferring speed of a film: 70 m/minute
   Vapor-deposited face: corona-treated face
(2) Then, using the biaxially stretched nylon film on which the vapor-deposited film of silicon oxide was formed above, this was mounted on a delivery roll of a take-up type vacuum vapor deposition apparatus, and drawn out onto a coating drum. Using aluminum as a vapor deposition source, a 0.02 μm-thick vapor-deposited film of aluminum oxide was formed on the above-mentioned vapor-deposited film of silicon oxide of the biaxially stretched nylon film on which the vapor-deposited film of silicon oxide was formed, while supplying oxygen gas, by the reaction vacuum vapor deposition method according to the electron beam (EB) heating system. Further, corona treatment was conducted on a face of the above-mentioned vapor-deposited film of aluminum oxide under the following conditions. As a result, the surface tension of the surface of the vapor-deposited film of aluminum oxide was improved from 45 dynes to 65 dynes.
   Output: 10 kW
   Treating speed: 100 m/minute
(3) Then, using the biaxially stretched nylon film on which the vapor-deposited film of aluminum oxide and the vapor-deposited film of silicon oxide were formed above, the face of the vapor-deposited film of aluminum oxide was coated with gas barrier coating composition (LL) obtained in Example 26, by the gravure roll coating method, using a gravure printing machine and arranging a gravure coating roll for the first color. Thus, a coating film having a thickness of 1.2 g/m$^2$ (in the dry state) was formed. Then, a hardened coating film was formed by heat treatment at 120° C. for 2 minutes to produce a gas barrier coating film of the present invention. Then, in succession, a desired multi-color print pattern layer was formed on the hardened coating film of the above-mentioned gas barrier coating film, using the above-mentioned gravure printing machine and a gravure ink composition.
(4) Then, the biaxially stretched nylon film on which the print pattern layer was formed above was mounted on a first delivery roll of a dry laminating machine, and a face of the print pattern layer was coated with a two-part hardening type polyurethane adhesive for lamination at a rate of 4.5 g/m$^2$ (in the dry state) to form an adhesive layer for lamination according to the gravure roll coating method. Then, a 70 μm-thick unstretched polypropylene film was dry laminated onto a face of the above-mentioned adhesive layer for lamination to produce a laminate material. The oxygen permeability of this laminate material was 0.4 cm³/m²·atm·24 hr.

Example 63

A laminate material was produced in the entirely same manner as with Example 60 described above with the exception that the biaxially stretched polyethylene terephthalate film on which the print pattern was formed was mounted on a first delivery roll of an extrusion laminating machine, and a 70 μm-thick low-density polyethylene film was extrusion laminated onto the face of the print pattern layer while melt extruding low-density polyethylene for melt extrusion to a thickness of 20 μm, instead of dry laminating the 70 μm-thick low-density polyethylene film onto the face of the print pattern layer of the biaxially stretched polyethylene terephthalate film on which the print pattern layer was formed, with intervention of the laminating adhesive layer to produce the laminate material in (4) of Example 60 described above. The oxygen permeability of this laminate material was 0.2 cm³/m²·atm·24 hr.

Example 64

A laminate material was produced in the entirely same manner as with Example 61 described above with the exception that the biaxially stretched polypropylene film on which the print pattern was formed was mounted on a first delivery roll of an extrusion laminating machine, and a 70 μm-thick low-density polyethylene film was extrusion laminated onto the face of the print pattern layer while melt extruding low-density polyethylene for melt extrusion to a thickness of 20 μm, instead of dry laminating the 70 μm-thick unstretched polypropylene film onto the face of the print pattern layer of the biaxially stretched polypropylene film on which the print pattern layer as formed, with intervention of the laminating adhesive layer to produce the laminate material in (4) of Example 61 described above. The oxygen permeability of this laminate material was 0.6 cm³/m²·atm·24 hr.

Example 65

A laminate material was produced in the entirely same manner as with Example 62 described above with the exception that the biaxially stretched nylon film on which the print pattern was formed was mounted on a first delivery roll of an extrusion laminating machine, and a 70 μm-thick low-density polyethylene film was extrusion laminated onto the face of the print pattern layer while melt extruding low-density polyethylene for melt extrusion to a thickness of 20 μm, instead of dry laminating the 70 μm-thick unstretched polypropylene film onto the face of the print pattern layer of the biaxially stretched nylon film on which the print pattern layer was formed, with intervention of the laminating adhesive layer to produce the laminate material in (4) of Example 62 described above. The oxygen permeability of this laminate material was 0.5 cm³/m²·atm·24 hr.

Example 66

A laminate material was produced in the same manner as with Example 61 described above with the exception that gas barrier coating composition (N) was used in (3) of Example 61. The oxygen permeability of this laminate material was 0.4 cm³/m²·atm·24 hr.

Industrial Applicability

According to the present invention, the gas barrier coating compositions are obtained which are extremely low in the degree of oxygen permeation even under high humidity and harmless to the human body, and the coat materials showing more excellent gas barrier properties are obtained by applying them onto synthetic resin films provided with vapor-deposited films of synthetic resins, metals and/or inorganic compounds.

What is claimed is:

1. A coating composition comprising (a) ethylene-vinyl alcohol copolymer having a melt flow index of 1 to 50 g/10 minutes under the conditions of 210° C. and a load of 21.168 N and (b) at least one member selected from the group consisting of a condensate of a titanium alcoholate, a chelate compound of a titanium alcoholate, a hydrolysate of a chelate of a titanium compound and a titanium acylate, wherein said titanium alcoholate is of the formula:

$$R^1_m Ti(OR^2)_n \tag{1}$$

wherein $R^1$, when multiple $R^1$s exist, they are either identical to or different from each other, represents an organic group having 1 to 8 carbon atoms, $R^2$, when multiple $R^2$s exist, they are either identical to or different from each other, represents an alkyl group having 1 to 5 carbon atoms, an acyl group having 1 to 6 carbon atom or a phenyl group, and m is an integer of 0 or more, n is an integer of 1 or more and m+n is 4.

2. The coating composition according to claim 1, which further contains (c) a nitrogen-containing organic solvent.

3. The coating composition according to claim 1, which further contains (d) fine inorganic particles having an average particle size of 0.2 μm or less.

4. The coating composition according to claim 1, which further contains (e) a boron compound.

5. The coating composition according to claim 1, which has a heating gelation rate of 1 to 90%.

6. A method for producing the coating composition according to claim 1, which comprises hydrolyzing component (b) in water or a mixed solvent containing water and a hydrophilic organic solvent, followed by mixing with component (a).

7. A coating film in which a coating film formed of the coating composition according to claim 1 is laminated onto a synthetic resin film.

8. A coating film in which a vapor-deposited film of a metal and/or an inorganic compound and a coating film formed of the coating composition according to claim 1 are laminated onto a synthetic resin film.

9. The coating film according to claim 8, wherein said vapor-deposited film is a vapor-deposited film of an inorganic oxide by a chemical vapor deposition method and/or a physical vapor deposition method.

10. The coating composition according to claim 1, wherein ethylene-vinyl alcohol copolymer (a) has a content of repeating units derived from ethylene from 20 to 45 mol %.

11. The coating composition according to claim 1, wherein ethylene-vinyl alcohol copolymer (a) is a saponified product having 80 mol % or more degree of saponification.

12. The coating composition according to claim 1, wherein (b) is a member (b) hydrolyzed in water or a mixed solvent containing water and a hydrophilic solvent.

13. The coating composition according to claim 1, wherein (b) is a condensate of a titanium alcoholate.

14. The coating composition according to claim 1, wherein (b) is a chelate compound of a titanium alcoholate.

15. The coating composition according to claim 1, wherein (b) is a hydrolyzate of a chelate of a titanium compound.

16. The coating composition according to claim 1, wherein (b) is a titanium acylate.

* * * * *